United States Patent
Kato

(10) Patent No.: US 10,984,515 B2
(45) Date of Patent: Apr. 20, 2021

(54) IMAGE INSPECTION DEVICE AND ILLUMINATION DEVICE

(71) Applicant: OMRON Corporation, Kyoto (JP)

(72) Inventor: Yutaka Kato, Kyotanabe (JP)

(73) Assignee: OMRON Corporation, Kyoto (JP)

( * ) Notice: Subject to any disclaimer, the term of this patent is extended or adjusted under 35 U.S.C. 154(b) by 61 days.

(21) Appl. No.: 16/162,405

(22) Filed: Oct. 17, 2018

(65) Prior Publication Data

US 2019/0213729 A1 Jul. 11, 2019

(30) Foreign Application Priority Data

Jan. 10, 2018 (JP) .............................. JP2018-002090

(51) Int. Cl.
*G06K 9/00* (2006.01)
*G06T 7/00* (2017.01)
(Continued)

(52) U.S. Cl.
CPC ............ *G06T 7/0002* (2013.01); *G01B 11/30* (2013.01); *G01N 21/00* (2013.01);
(Continued)

(58) Field of Classification Search
CPC .... G01N 21/8806; G01N 21/00; G01B 11/30; G06T 7/0002; G02B 6/0031;
(Continued)

(56) References Cited

U.S. PATENT DOCUMENTS

2003/0058631 A1* 3/2003 Yoneda .............. G01N 21/8806
362/23.16
2005/0052643 A1* 3/2005 Lange ................ G01N 21/8806
356/237.1
(Continued)

FOREIGN PATENT DOCUMENTS

JP 2003098093 4/2003
JP 2005091049 4/2005
(Continued)

OTHER PUBLICATIONS

"Search Report of Europe Counterpart Application", dated Dec. 4, 2018, p. 1-p. 8.
(Continued)

*Primary Examiner* — Huy C Ho
(74) *Attorney, Agent, or Firm* — JCIPRNET

(57) ABSTRACT

The disclosure provide an image inspection device and an illumination device. The image inspection device includes a photographing part; an illumination part including a light guide plate disposed at any position between the object and the photographing part; and a control part. The illumination part includes a first light emitting part and a second light emitting part disposed around the light guide plate; and a first reflective part and a second reflective part. The reflective parts are configured so that a light emitting surface of the light guide plate has an emission intensity distribution of a first pattern when the first light emitting part emits light under control of the control part, and the light emitting surface has an emission intensity distribution of a second
(Continued)

pattern different from the first pattern when the second light emitting part emits light under control of the control part.

15 Claims, 16 Drawing Sheets

(51) Int. Cl.
    *F21V 8/00*     (2006.01)
    *G01N 21/88*     (2006.01)
    *G01B 11/30*     (2006.01)
    *G03B 17/54*     (2021.01)
    *G01N 21/00*     (2006.01)
    *G03B 15/03*     (2021.01)

(52) U.S. Cl.
    CPC ....... G01N 21/8806 (2013.01); G02B 6/0031 (2013.01); G02B 6/0073 (2013.01); G03B 15/03 (2013.01); G03B 17/54 (2013.01); G03B 2215/0582 (2013.01)

(58) Field of Classification Search
    CPC ...... G02B 6/0073; G03B 15/03; G03B 17/54; G03B 2215/0582
    USPC ......................................................... 382/100
    See application file for complete search history.

(56) References Cited

U.S. PATENT DOCUMENTS

| | | |
|---|---|---|
| 2008/0106744 A1 | 5/2008 | Lu |
| 2008/0297779 A1 | 12/2008 | Taniguchi et al. |
| 2014/0014848 A1 | 1/2014 | Hatakeyama et al. |
| 2014/0372075 A1* | 12/2014 | Kojima ............... G01N 21/55 |
| | | 702/167 |

FOREIGN PATENT DOCUMENTS

| | | |
|---|---|---|
| JP | 2006047290 | 2/2006 |
| JP | 2007033347 | 2/2007 |
| JP | 2007206797 | 8/2007 |
| JP | 2009189014 | 8/2009 |
| JP | 2010113735 | 5/2010 |

OTHER PUBLICATIONS

Office Action of Japan Counterpart Application, with English translation thereof, dated Jan. 5, 2021, pp. 1-7.

* cited by examiner

IMAGE INSPECTION DEVICE AND ILLUMINATION DEVICE

CROSS-REFERENCE TO RELATED APPLICATION

This application claims the priority benefit of Japan application serial no. 2018-002090, filed on Jan. 10, 2018. The entirety of the above-mentioned patent application is hereby incorporated by reference herein and made a part of this specification.

BACKGROUND

Technical Field

The technology relates to an image inspection device for inspecting an object by using a photographic image and an illumination device.

Description of Related Art

In fields such as factory automation (FA), it is conventional to photograph an object under illumination and inspect the appearance of the object by using the photographic image that is obtained.

For example, Japanese Laid-open No. 2007-206797 (Patent Document 1) has disclosed an image processing device in which a plurality of light sources are installed with their optical axes with respect to the object oriented diagonally downward, and every time the image processing device illuminates the object with the light sources, the image processing device photographs the object with a camera disposed right above the object and inspects the appearance of the object by using a plurality of photographic images that are obtained. With this device, it is possible to make the angles of the optical axes from multiple light sources to the object different from one another to differentiate the gradation patterns appearing on the object and inspect the appearance of the object based on the result of calculation processing using multiple photographic images in which different gradation patterns appear.

Problems to be Solved

The conventional device described above can inspect the appearance of the object by using a plurality of photographic images in which different gradation patterns appear. However, while the camera is disposed right above the object, it is necessary to arrange the light sources at positions different from one another in the periphery of the camera so as to put the optical axes with respect to the object at different angles, and the device as a whole is inevitably large in size. For this reason, there is a concern that the device faces restriction in selecting applicable equipment.

SUMMARY

The disclosure provides an image inspection device and an illumination device to avoid as much as possible restriction in selecting applicable equipment.

Means for Solving the Problems

According to an embodiment of the disclosure, an image inspection device is provided for inspecting an object by using a photographic image. The image inspection device includes a photographing part photographing the object; an illumination part including a light guide plate disposed at any position between the object and the photographing part; and a control part controlling the illumination part and the photographing part, wherein the illumination part includes: a first light emitting part and a second light emitting part disposed around the light guide plate; and a plurality of reflective parts including a first reflective part reflecting mainly light from the first light emitting part toward the object and a second reflective part reflecting mainly light from the second light emitting part toward the object, and the reflective parts are configured so that a light emitting surface of the light guide plate has an emission intensity distribution of a first pattern when the first light emitting part emits light under control of the control part, and the light emitting surface has an emission intensity distribution of a second pattern different from the first pattern when the second light emitting part emits light under control of the control part.

According to an example of the disclosure, an illumination device is provided that includes the illumination part of the image inspection device provided in the above disclosure.

DESCRIPTION OF THE EMBODIMENTS

Figure 1:
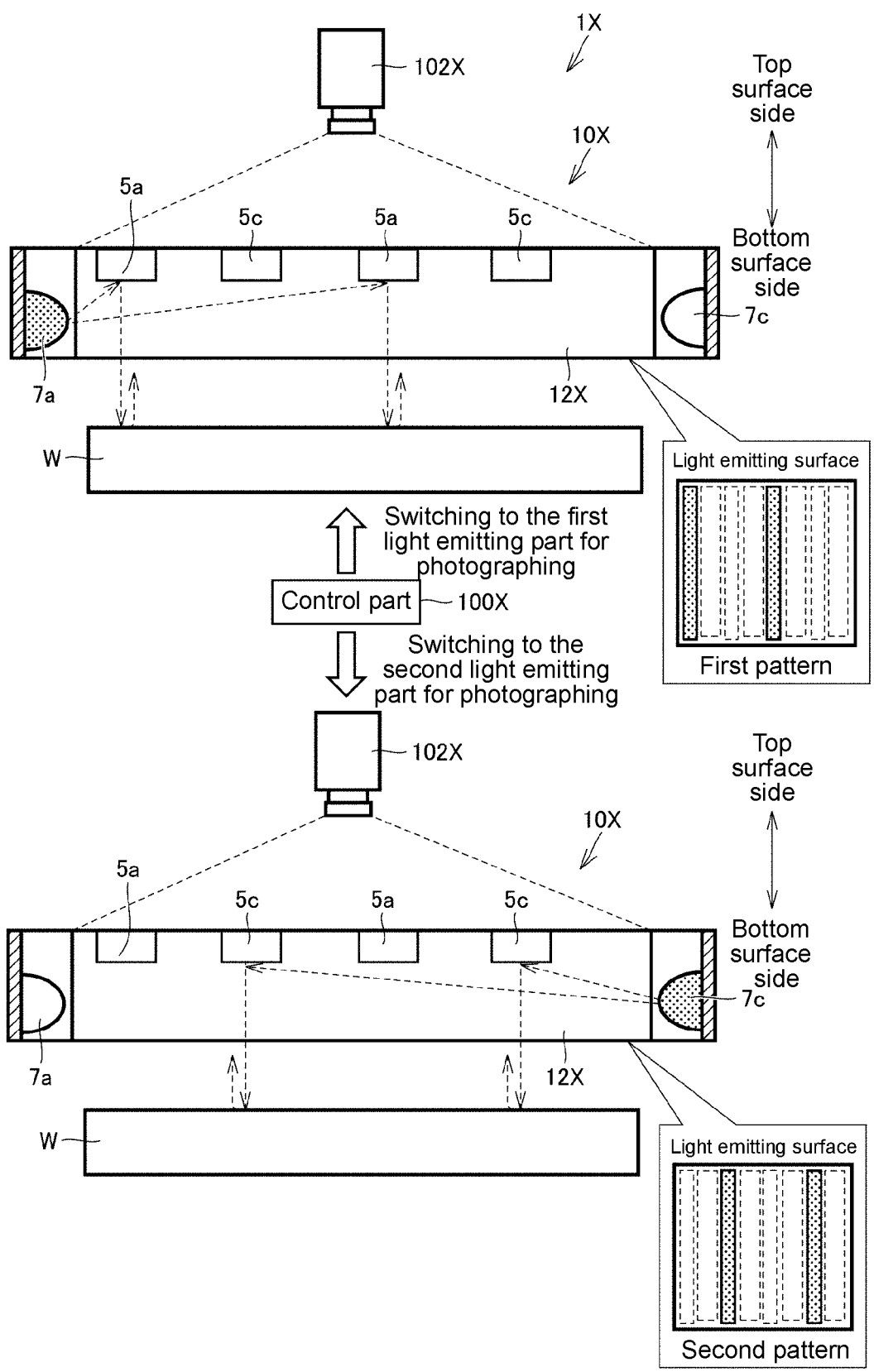
FIG. 1 is a schematic diagram showing an overview of the image inspection device according to the present embodiment.

According to an embodiment of the disclosure, an image inspection device is provided for inspecting an object by using a photographic image. The image inspection device includes a photographing part photographing the object; an illumination part including a light guide plate disposed at any position between the object and the photographing part; and a control part controlling the illumination part and the photographing part, wherein the illumination part includes: a first light emitting part and a second light emitting part disposed around the light guide plate; and a plurality of reflective parts including a first reflective part reflecting mainly light from the first light emitting part toward the object and a second reflective part reflecting mainly light from the second light emitting part toward the object, and the reflective parts are configured so that a light emitting surface of the light guide plate has an emission intensity distribution of a first pattern when the first light emitting part emits light under control of the control part, and the light emitting surface has an emission intensity distribution of a second pattern different from the first pattern when the second light emitting part emits light under control of the control part.

According to the disclosure, in the image inspection device, the light guide plate of the illumination part is disposed at any position between the object and the photographing part, and the emission intensity distribution of the pattern on the light emitting surface of the light guide plate can be differentiated by controlling the first light emitting part or the second light emitting part. Therefore, while the entire device can be made smaller than a device in which the illumination part is not located between the object and the photographing part, the emission intensity distribution of the pattern on the light emitting surface of the light guide plate can be changed. Thus, the provided image inspection device can avoid restriction in selecting applicable equipment as much as possible.

In the above disclosure, each of the first pattern and the second pattern is a gradation pattern, and the gradation patterns of the first pattern and the second pattern are shifted from each other.

According to the disclosure, the gradation patterns on the light emitting surface of the light guide plate can be differentiated from each other by the first light emitting part and the second light emitting part.

In the above disclosure, one light guide plate is provided, the first light emitting part and the second light emitting part are disposed around the one light guide plate, and the first reflective part and the second reflective part are included in the one light guide plate.

According to the disclosure, since the illumination part can be configured by using one light guide plate, the entire device can be made smaller.

In the above disclosure, the light guide plate is composed of a plurality of plates including a first light guide plate and a second light guide plate, the first light emitting part is disposed around the first light guide plate, the second light emitting part is disposed around the second light guide plate, the first reflective part is included in the first light guide plate, and the second reflective part is included in the second light guide plate.

According to the disclosure, the illumination part can be configured by using a plurality of light guide plates, so that it is possible to design the illumination part for each light guide plate.

In the above disclosure, the reflective parts are formed by cutting out a part of the light guide plate. According to the disclosure, since the reflective parts are formed by cutting out a part of the light guide plate, it is not required to prepare separate members for the reflective parts.

In the above disclosure, the control part selectively switches and controls the first light emitting part and the second light emitting part in a predetermined order, and photographs the object with the photographing part every time control for the first light emitting part and the second light emitting part is switched.

According to the disclosure, selective switching between the first light emitting part and the second light emitting part can be performed in conjunction with the photographing of the photographing part.

In the above disclosure, at least one of the first light emitting part and the second light emitting part is configured to be capable of changing an emission wavelength.

According to the disclosure, since the wavelength of the light from the illumination part can be changed, it is possible to inspect the object under optimum conditions.

In the above disclosure, the control part changes an emission amount of at least one of the first light emitting part and the second light emitting part.

According to the disclosure, since the emission amount of the light from the illumination part can be changed, it is possible to inspect the object under optimum conditions.

According to an example of the disclosure, an illumination device is provided that includes the illumination part of the image inspection device provided in the above disclosure.

According to the disclosure, it is possible to provide an illumination device that includes the illumination part of the image inspection device to avoid restriction in selecting applicable equipment as much as possible.

Effects

According to the disclosure, it is possible to provide an image inspection device and an illumination device that avoid restriction in selecting applicable equipment as much as possible.

Embodiments of the disclosure will be described in detail with reference to the drawings. In the drawings, the same or corresponding portions are denoted by the same reference numerals, and the description thereof will not be repeated.

<A. Application Example>

First, an example of the scene to which the disclosure is applied will be described with reference to FIG. 1. FIG. 1 is a schematic diagram showing an overview of an image inspection device 1X according to the present embodiment.

The image inspection device 1X according to the present embodiment is applied to a device that illuminates and photographs an object (hereinafter also referred to as "workpiece W") in a production line, etc., of industrial products and performs appearance inspection (inspection of scratches, dirt, foreign matter, etc.) on the object by using the obtained photographic image. Since the image inspection device 1X carries out inspection by detecting the light reflected by the workpiece W, the workpiece that reflects light such as a liquid crystal display is applied for the workpiece W.

As shown in FIG. 1, the image inspection device 1X includes a photographing part 102X for photographing the workpiece W, an illumination part 10X for illuminating the workpiece W, and a control part 100X for controlling the illumination part 10X and the photographing part 102X.

The photographing part 102X is for photographing a subject existing in a photography visual field to generate image data, and photographing the workpiece W, which is the object under appearance inspection, as the subject through a light guide plate 12X. In the present embodiment, a camera is provided as an example of the photographing part 102X.

The illumination part 10X illuminates the surface of the workpiece W every time the photographing part 102X photographs the workpiece W. The illumination part 10X includes a light guide plate 12X disposed at any position between the workpiece W and the photographing part 102X, a first light emitting part 7a and a second light emitting part 7c disposed around the light guide plate 12X, and a first reflective part 5a and a second reflective part 5c inside the light guide plate 12X. In FIG. 1, for convenience of description, the side of the surface of the light guide plate 12X located on the side of the photographing part 102X is defined as the "top surface side" and the side of the surface located on the side of the workpiece W is defined as the "bottom surface side".

The light guide plate 12X introduces light of each of the first light emitting part 7a and the second light emitting part 7b disposed around the light guide plate 12X and moves and diffuses the introduced light inside to emit the light to the outside, so as to guide the light of each of the first light emitting part 7a and the second light emitting part 7b to the workpiece W. The first light emitting part 7a and the second light emitting part 7b may be fluorescent lamps, etc. using LED (Light Emitting Diode) or cathode tubes. In addition, the light color of the first light emitting part 7a and the second light emitting part 7b is not necessarily white and may be red, green, blue, etc., or a combination of these colors. In other words, the first light emitting part 7a and the second light emitting part 7b may change the wavelength of the light. In the present embodiment, LEDs are provided as the first light emitting part 7a and the second light emitting part 7b, for example.

The number of the first light emitting parts 7a and the number of the second light emitting parts 7b may be only one or more than one. The shape of the light guide plate 12X may be a polygon, such as a quadrangle or a triangle, a circle, an ellipse, etc. when viewed from the top surface side or the bottom surface side. In the present embodiment, the shape of the light guide plate 12X is a quadrangle when viewed from the top surface side or the bottom surface side, for example. It is preferable to use a member such as acrylic that has excellent light guiding properties as the light guide plate 12X.

The light guide plate 12X has a first reflective part 5a and a second reflective part 5c inside. The shape nd position of each of the first reflective part 5a and the second reflective part 5c are designed so that the light from each of the first light emitting part 7a and the second light emitting part 7c is reflected to be guided in the direction where the workpiece W is located (the direction of the bottom surface side). For example, the first reflective part 5a mainly reflects light from the first light emitting part 7a toward the workpiece W. The second reflective part 5c mainly reflects light from the second light emitting part 7c toward the workpiece W. Each of the first reflective part 5a and the second reflective part 5c may have a plate shape, a rectangular shape, or a triangular shape, or may be formed by cutting out a part of the light guide plate 12X by laser processing, etc. if it can reflect the light respectively from the first light emitting part 7a and the second light emitting part 7c to guide the light in the direction where the workpiece W is located.

The number of the first reflective parts 5a and the number of the second reflective parts 5c may be only one or more than one. In the case where a plurality of the first light emitting parts 7a are provided, a plurality of the first reflective parts 5a may be provided to correspond to the first light emitting parts 7a respectively. Likewise, in the case where a plurality of the second light emitting parts 7c are provided, a plurality of the second reflective parts 5c may be provided to correspond to the second light emitting parts 7c respectively. Furthermore, the number of the light guide plates 12X is not necessarily one, and a plurality of the light guide plates 12X may be provided, and a set of the light emitting part and the reflective part may be configured in each of the light guide plates. For example, the first light emitting part 7a and the first reflective part 5a may be provided in a first light guide plate, and the second light emitting part 7c and the second reflective part 5c may be provided in the second light guide plate.

The light guide plate 12X is disposed at any position between the workpiece W and the photographing part 102X. Therefore, the workpiece W, the photographing part 102X, and the light from the illumination part 10X can be put on the same axis. With such a configuration, the light reflected by the first reflective part 5a and the second reflective part 5c and emitted from the light guide plate 12X is reflected by the workpiece W, and the reflected light again passes through the inside of the light guide plate 12X to reach the photographing part 102X.

The control part 100X can control only the first light emitting part 7a to emit light, only the second light emitting part 7c to emit light, or both the first light emitting part 7a and the second light emitting part 7c to emit light.

The first reflective part 5a and the second reflective part 5c are disposed at different positions. Therefore, when only the first light emitting part 7a emits light, the light emitting surface of the light guide plate 12X forms a pattern of emission intensity distribution that makes the position corresponding to the first reflective part 5a the brightest and decreases the brightness as it is farther away from the position. The first pattern shown in FIG. 1 is a pattern of emission intensity distribution of viewing the workpiece W through the light guide plate 12X with the photographing part 102X when only the first light emitting part 7a emits light. However, when only the second light emitting part 7c emits light, the light emitting surface of the light guide plate 12X forms a pattern of emission intensity distribution that makes the position corresponding to the second reflective part 5c the brightest and decreases the brightness as it is farther away from the position. The second pattern shown in FIG. 1 is a pattern of emission intensity distribution of viewing the workpiece W through the light guide plate 12X with the photographing part 102X when only the first light emitting part 7c emits light. The "emission intensity" is an example of the degree of light emission or light intensity, and may be luminance (cd/m$^2$), luminous intensity (cd), luminous flux (lm), illuminance (lx), etc., for example.

In the image inspection device 1X having the configuration as described above, each configuration works as follows. That is, when the first light emitting part 7a emits light under control of the control part 100X, the light from the first light emitting part 7a is introduced into the light guide plate 12X and mainly reflected by the first reflective part 5a to be directed toward the workpiece W. The light reflected by the workpiece W again passes through the inside of the light guide plate 12X and reaches the photographing part 102X. At this time, the light emitting surface of the light guide plate 12X has the emission intensity distribution of the first pattern shown in FIG. 1. When the photographing part 102X photographs the workpiece W through the light guide plate 12X under control of the control part 100X, in the obtained photographic image, the emission intensity distribution of the first pattern is reflected in the state of being projected to the workpiece W. Next, when the second light emitting part 7c emits light under control of the control part 100X, the light from the second light emitting part 7c is introduced into the light guide plate 12X and mainly reflected by the second reflective part 5c to be directed toward the workpiece W. The light reflected by the workpiece W again passes through the inside of the light guide plate 12X and reaches the photographing part 102X. At this time, the light emitting surface of the light guide plate 12X has the emission intensity distribution of the second pattern shown in FIG. 1. When the photographing part 102X photographs the workpiece W through the light guide plate 12X under control of the control part 100X, in the obtained photographic image, the emission intensity distribution of the second pattern is reflected in the state of being projected to the workpiece W. The image inspection device 1X makes it possible to inspect the appearance of the workpiece W by using a plurality of photographic images with different gradation patterns obtained in this manner.

In the image inspection device 1X, a plurality of photographic images may be displayed on a display part such as a monitor for the operator to visually inspect the appearance of the workpiece W, or the appearance of the workpiece W may be inspected based on the result of a calculation process performed by using a plurality of photographic images.

As described above, in the image inspection device 1X according to the present embodiment, the light guide plate 12X of the illumination part 10X is disposed at any position between the workpiece W and the photographing part 102X and the first light emitting part 7a and the second light emitting part 7c which differentiate the emission intensity distributions of the gradation patterns on the light emitting surface of the light guide plate 12X are disposed around the light guide plate 12X. Therefore, the entire device can be made smaller than a device in which the illumination part 10X is not located between the workpiece W and the photographing part 102X. Thus, it is possible to provide the image inspection device 1X which avoids restriction in selecting applicable equipment as much as possible. While the workpiece W, the photographing part 102X, and the light from the illumination part 10X are constantly put on the same axis, the gradation pattern formed on the light emitting surface of the light guide plate 12X can be changed by switching the light emitting parts that serve as the light emitting target. Therefore, it is possible to inspect the appearance of the workpiece W accurately without using a transport mechanism, etc. Furthermore, by putting the workpiece W, the photographing part 102X, and the light from the illumination part 10X constantly on the same axis, the three distances can be kept short. Thus, light leakage can be prevented as much as possible, and the appearance of the workpiece W can be inspected more accurately.

<B. An Example of the Production Line to which the Image Inspection Device is Applied>

Figure 2:
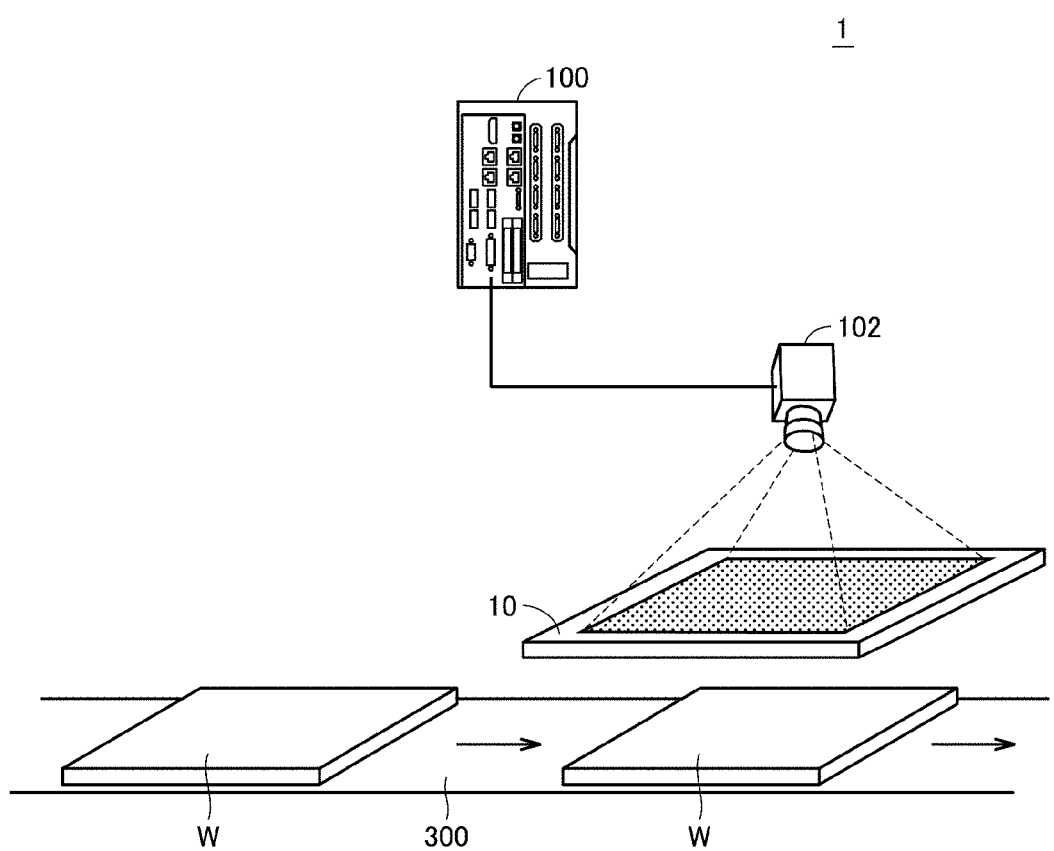
FIG. 2 is a schematic diagram showing an example of a production line to which the image inspection device according to the present embodiment is applied.

Next, an example of the image inspection device according to the present embodiment will be described. First, an example of the production line to which an image inspection device 1, which is an example of the image inspection device, is applied will be described with reference to FIG. 2. FIG. 2 is a schematic diagram showing an example of the production line to which the image inspection device 1 according to the present embodiment is applied.

As shown in FIG. 2, the image inspection device 1 according to the present embodiment includes a camera 102 for photographing workpieces W that are continuously transported in, an illumination device 10 for illuminating the workpiece W, and a control device 100 for controlling the illumination device 10 and the camera 102. The camera 102 includes an optical system such as a lens and an aperture, and a light receiving element such as a CCD (Charge Coupled Device) image sensor and a CMOS (Complementary Metal Oxide Semiconductor) image sensor as main components. The image inspection device 1 is a device on the production line of industrial products, etc. for photographing the workpiece W with the camera 102 while illuminating the workpiece W with the illumination device 10 under control of the control device 100 and inspecting the appearance of the workpiece W by using the obtained photographic image.

Specifically, the workpiece W to be inspected is moved to an inspection position where the camera 102 and the illumination device 10 are fixed by a movable stage 300. When the workpiece W moves to the inspection position, it stops there until the appearance inspection performed by the image inspection device 1 is completed. At this time, the control device 100 photographs the workpiece W with the camera 102 while illuminating the workpiece W with the illumination device 10. The control device 100 can change an irradiation form of the light from the illumination device 10, and photographs the workpiece W with the camera 102 every time the irradiation form of the light is changed. The image inspection device 1 inspects the appearance of the workpiece W by using a plurality of photographic images obtained in this manner.

In the image inspection device 1 according to the present embodiment, the camera 102 is an example of the "photographing part", the illumination device 10 is an example of the "illumination part" or an "illumination device" including the illumination part, and the control device 100 is an example of the "control part".

<C. An Example of the Hardware Configuration of the Control Device>

Figure 3:
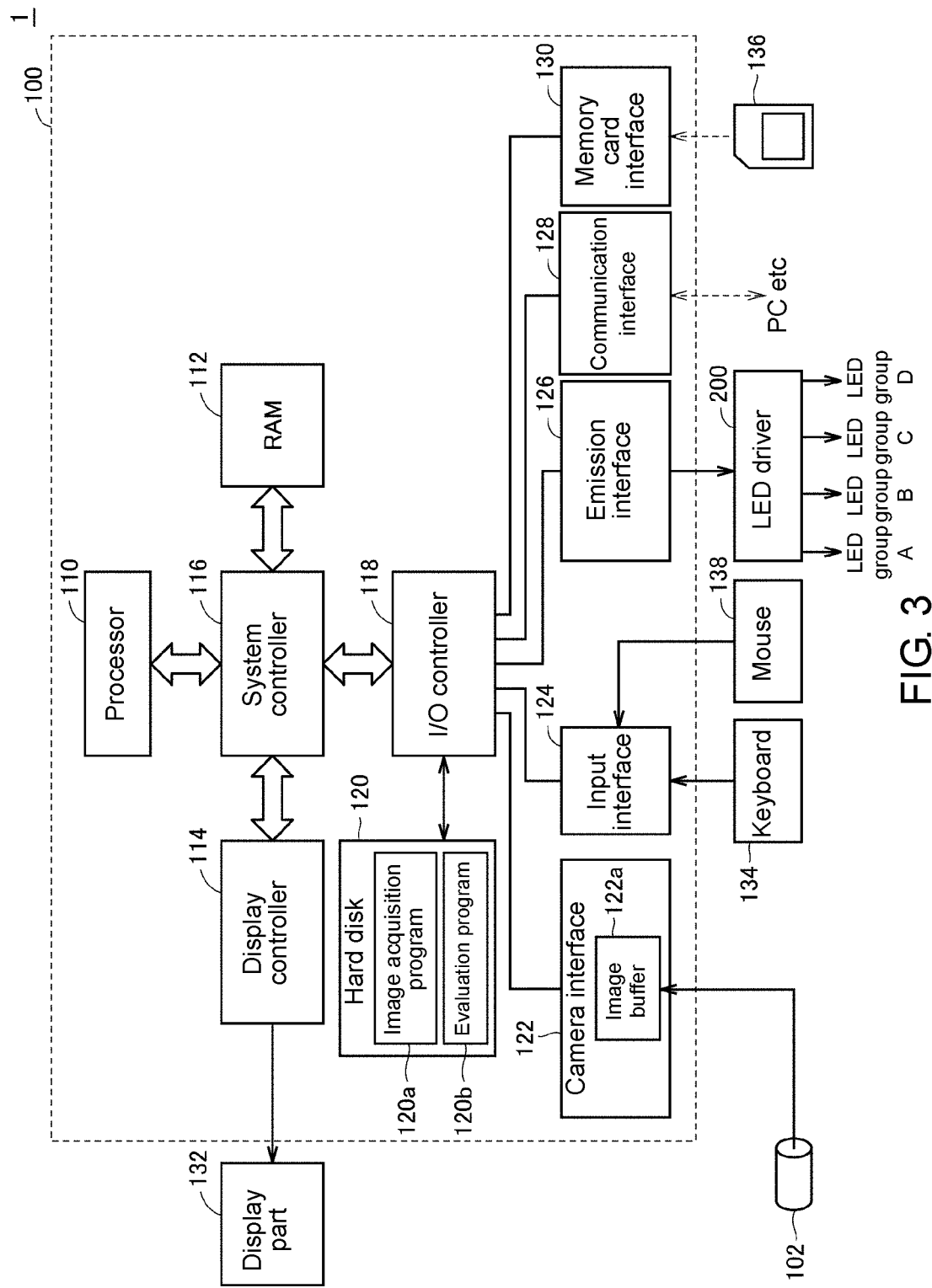
FIG. 3 is a schematic diagram showing an example of the hardware configuration of the control device according to the present embodiment.

FIG. 3 is a schematic diagram showing an example of the hardware configuration of the control device 100 according to the present embodiment. As shown in FIG. 3, typically, the control device 100 has a structure conforming to the general-purpose computer architecture, and realizes various processes when a processor executes preinstalled programs.

More specifically, the control device 100 includes a processor 110 such as a CPU (Central Processing Unit) and a MPU (Micro-Processing Unit), a RAM (Random Access Memory) 112, a display controller 114, a system controller 116, an I/O (Input Output) controller 118, a hard disk 120, a camera interface 122, an input interface 124, an emission interface 126, a communication interface 128, and a memory card interface 130. These parts are connected to one another to communicate data with each other with the system controller 116 as the center.

The processor 110 exchanges programs (codes), etc. with the system controller 116 and executes them in a predetermined order to realize the target arithmetic processing.

The system controller 116 is connected to the processor 110, the RAM 112, the display controller 114, and the I/O controller 118 via a bus respectively, and exchanges data with each part and controls processing of the entire control device 100.

Typically, the RAM 112 is a volatile storage device such as a DRAM (Dynamic Random Access Memory), and holds programs read from the hard disk 120 or photographic images (image data), etc. acquired by the camera 102.

The display controller 114 is connected to the display part 132, and outputs a signal for displaying various information to the display part 132 according to an internal command from the system controller 116.

The I/O controller 118 controls data exchange with a recording medium or an external device connected to the control device 100. More specifically, the I/O controller 118 is connected to the hard disk 120, the camera interface 122, the input interface 124, the emission interface 126, the communication interface 128, and the memory card interface 130.

Typically, the hard disk 120 is a non-volatile magnetic storage device. In addition to control programs such as algorithm to be executed by the processor 110, various setting values, etc. are stored in the hard disk 120. In the present embodiment, the control programs installed in the hard disk 120 include an image acquisition program 120a executed when the illumination device 10 and the camera 102 are controlled in order to acquire the photographic image of the workpiece W, and an evaluation program 120b executed when appearance inspection of the workpiece W is performed by using the acquired photographic image, for example. These control programs are distributed in a state of being stored in a memory card 136, etc. A semiconductor storage device such as a flash memory or an optical storage device such as a DVD-RAM (Digital Versatile Disk Random Access Memory) may be adopted in place of the hard disk 120.

The camera interface 122 acquires a photographic image (image data) by photographing the workpiece W and mediates data transmission between the processor 110 and the camera 102. The camera interface 122 includes an image buffer 122a for temporarily accumulating the photographic images (image data) from the camera 102.

The input interface 124 mediates data transmission between the processor 110 and input devices such as a keyboard 134 and a mouse 138.

The emission interface 126 mediates data transmission between the processor 110 and a LED driver 200. The LED driver 200 drives a plurality of LEDs (LED group A to LED group D) by supplying power. The processor 110 can increase or decrease the number of LEDs that serve as the light emitting target, selectively switch the LEDs that serve as the light emitting target among a plurality of LEDs (LED group A to LED group D), or adjust the power supply through the LED driver 200 so as to change the emission amount of the LEDs to adjust the brightness.

The communication interface 128 mediates data transmission between the processor 110 and another personal computer, server device, etc. (not shown). The communication interface 128 is typically composed of Ethernet (registered trademark), USB (Universal Serial Bus), etc.

The memory card interface 130 mediates data transmission between the processor 110 and a memory card 136 which is a recording medium. A control program 150, etc. to be executed by the control device 100 is distributed in a state of being stored in the memory card 136, and the memory card interface 130 reads the control program from the memory card 136. The memory card 136 is composed of a general-purpose semiconductor storage device such as SD (Secure Digital), a magnetic recording medium such as a flexible disk (Flexible Disk), or an optical recording medium such as a CD-ROM (Compact Disk Read Only Memory). Alternatively, a program downloaded from a delivery server, etc. may be installed in the control device 100 via the communication interface 128.

In the case of using a computer having a structure conforming to the general-purpose computer architecture as described above, in addition to the applications for providing the functions of the present embodiment, an OS (Operating System) for providing basic functions of the computer may be installed. In that case, the control program according to the present embodiment may execute processing by calling out the required modules in a predetermined order and/or timing from the program modules provided as a part of the OS.

Furthermore, the control programs such as the image acquisition program and the evaluation program according to the present embodiment may be incorporated in a part of another program to be provided. In that case, the program itself does not include the module included in another program to be combined as described above, and the processing is executed in cooperation with the another program. In other words, the control program according to the present embodiment may be in a form of being incorporated in such another program.

Alternatively, a part or all of the functions provided by execution of the control program may be implemented as a dedicated hardware circuit.

<D. An Example of the Configuration of the Illumination Device>

Figure 4:
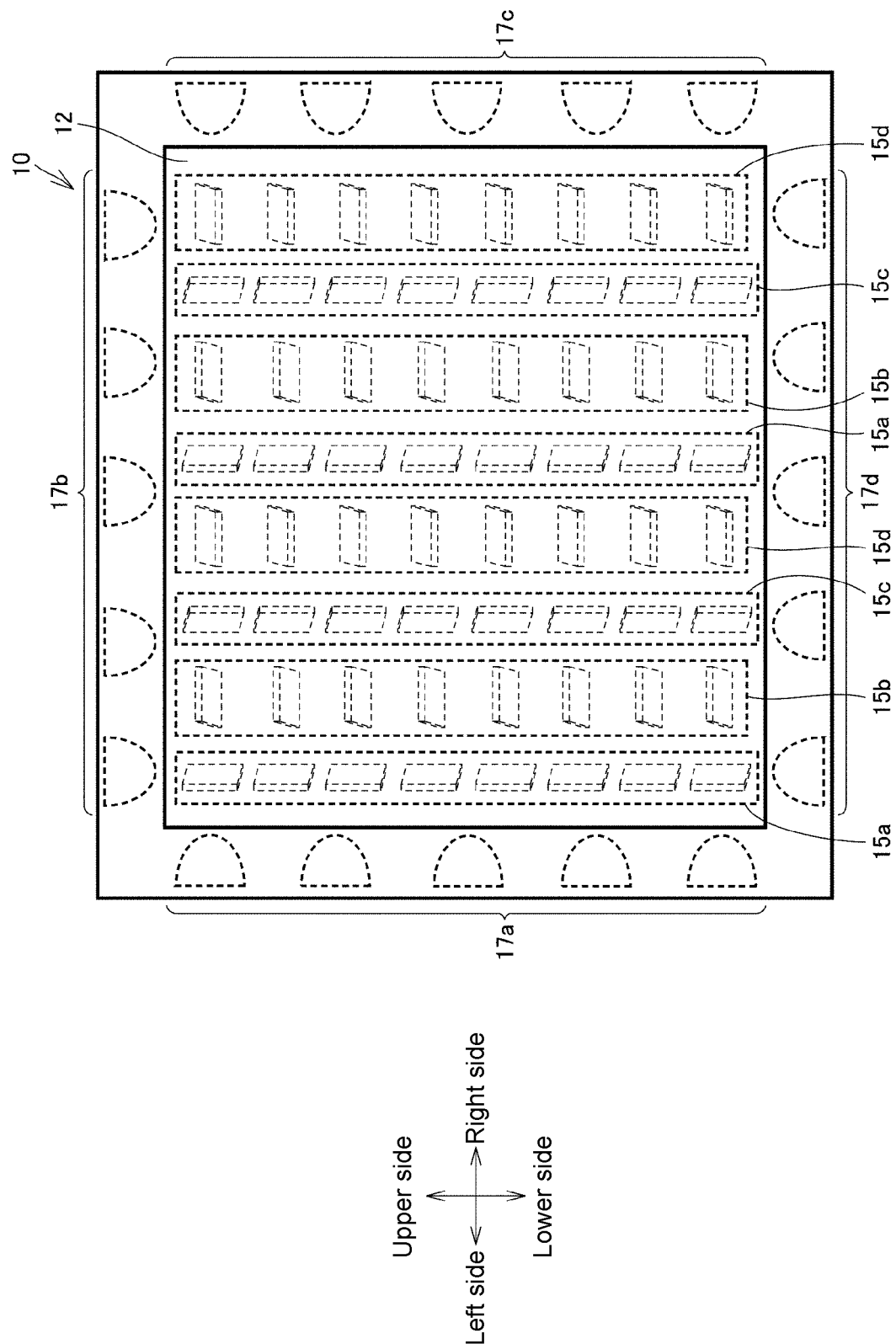
FIG. 4 is a schematic diagram showing the top surface of the illumination device according to the present embodiment.

An example of the configuration of the illumination device 10 according to the present embodiment will be described with reference to FIG. 4. FIG. 4 is a schematic diagram showing the top surface of the illumination device 10 according to the present embodiment.

As shown in FIG. 4, the illumination device 10 is a transmissive sheet illumination and includes a light guide plate 12, a plurality of LEDs 17a to 17d disposed around the light guide plate 12, and a plurality of reflective plates 15a to 15d inside the light guide plate 12. In FIG. 4, for convenience of description, toward the front of the drawing, the upper side is defined as "upper side", the lower side is defined as "lower side", the left side is defined as "left side", and the right side is defined as "right side". In FIG. 6 to FIG. 10 which will be described later, the "upper side", "lower side", "left side", and "right side" are defined in the same manner.

The light guide plate 12 is a flat plate-shaped member that introduces light from each of the LEDs 17a to 17d disposed around the light guide plate 12 and moves and diffuses the introduced light inside to emit the light to the outside, so as to guide the light from each of the LEDs 17a to 17d to the workpiece W. The shape of the light guide plate 12 according to the present embodiment is a quadrangle when viewed from the top surface or the bottom surface of the illumination device 10. A member such as acrylic that has excellent light guiding properties is used as the light guide plate 12.

Each of the LEDs 17a to 17d emits white light. The LEDs 17a to 17d are arranged along the respective sides of the flat plate-shaped light guide plate 12. In the present embodiment, as shown in FIG. 4, a plurality of LEDs 17a (hereinafter also referred to as "LED group A") are arranged along the side located on the left side of the light guide plate 12 and a plurality of LEDs 17c (hereinafter also referred to as "LED group C") are arranged along the side located on the right side of the light guide plate 12 so that the LED group A and the LED group C are opposite to each other. Further, a plurality of LEDs 17b (hereinafter also referred to as "LED group B") are arranged along the side located on the upper side of the light guide plate 12 and a plurality of LEDs 17d (hereinafter also referred to as "LED group D") are arranged along the side located on the lower side of the light guide plate 12 so that the LED group B and the LED group D are opposite to each other.

Thus, the light from the LED group A enters from the left side of the light guide plate 12, the light from the LED group B enters from the upper side of the light guide plate 12, the light from the LED group C enters from the right side of the light guide plate 12, and the light from the LED group D enters from the lower side of the light guide plate 12.

One of the LED group A to the LED group D is an example of the "first light emitting part" and another LED group is an example of the "second light emitting part".

The reflective plates 15a to 15d are flat plate-shaped members inside the light guide plate 12, and the shape and position thereof are designed so that the light from each of the LED group A to the LED group D is reflected to be guided in the direction where the workpiece W is located. In the present embodiment, as shown in FIG. 4, the reflective plate 15a is inclined toward the LED group A to form an inclination angle for mainly reflecting the light from the LED group A in the direction where the workpiece W is located, the reflective plate 15b is inclined toward the LED group B to form an inclination angle for mainly reflecting the light from the LED group B in the direction where the workpiece W is located, the reflective plate 15c is inclined toward the LED group C to form an inclination angle for mainly reflecting the light from the LED group C in the direction where the workpiece W is located, and the reflective plate 15d is inclined toward the LED group D to form an inclination angle for mainly reflecting the light from the LED group D in the direction where the workpiece W is located.

Thus, the light from the LED group A that has entered the light guide plate 12 is mainly reflected by the reflective plate 15a and guided in the direction where the workpiece W is located. The light from the LED group B that has entered the light guide plate 12 is mainly reflected by the reflective plate 15b and guided in the direction where the workpiece W is located. The light from the LED group C that has entered the light guide plate 12 is mainly reflected by the reflective plate 15c and guided in the direction where the workpiece W is located. The light from the LED group D that has entered the light guide plate 12 is mainly reflected by the reflective plate 15d and guided in the direction where the workpiece W is located.

In addition, the reflective plates 15a to 15d are arranged respectively in rows in the left-right direction of the light guide plate 12. Specifically, a plurality of the reflective plates 15a, the reflective plates 15b, the reflective plates 15c, the reflective plates 15d, the reflective plates 15a, the reflective plates 15b, the reflective plates 15c, and the reflective plates 15d are arranged side by side in the order from the left when viewed from the top surface of the light guide plate 12.

Thus, when only the LED group A emits light, the light emitting surface of the light guide plate 12 forms a pattern of emission intensity distribution that makes the position corresponding to the reflective plate 15a the brightest and decreases the brightness as it is farther away from the position. When only the LED group B emits light, the light emitting surface of the light guide plate 12 forms a pattern of emission intensity distribution that makes the position corresponding to the reflective plate 15b the brightest and decreases the brightness as it is farther away from the position. When only the LED group C emits light, the light emitting surface of the light guide plate 12 forms a pattern of emission intensity distribution that makes the position corresponding to the reflective plate 15c the brightest and decreases the brightness as it is farther away from the position. When only the LED group D emits light, the light emitting surface of the light guide plate 12 forms a pattern of emission intensity distribution that makes the position corresponding to the reflective plate 15d the brightest and decreases the brightness as it is farther away from the position.

One of the reflective plates 15a to 15d is an example of the "first reflective part" and another is an example of the "second reflective part". Moreover, the pattern of emission intensity distribution formed when only one of the LED group A to the LED group D emits light is an example of the "first pattern" and the pattern of emission intensity distribution formed when only another LED group emits light is an example of the "second pattern".

<E. An Example of the Gradation Pattern formed by the Illumination Device>

Figure 5:
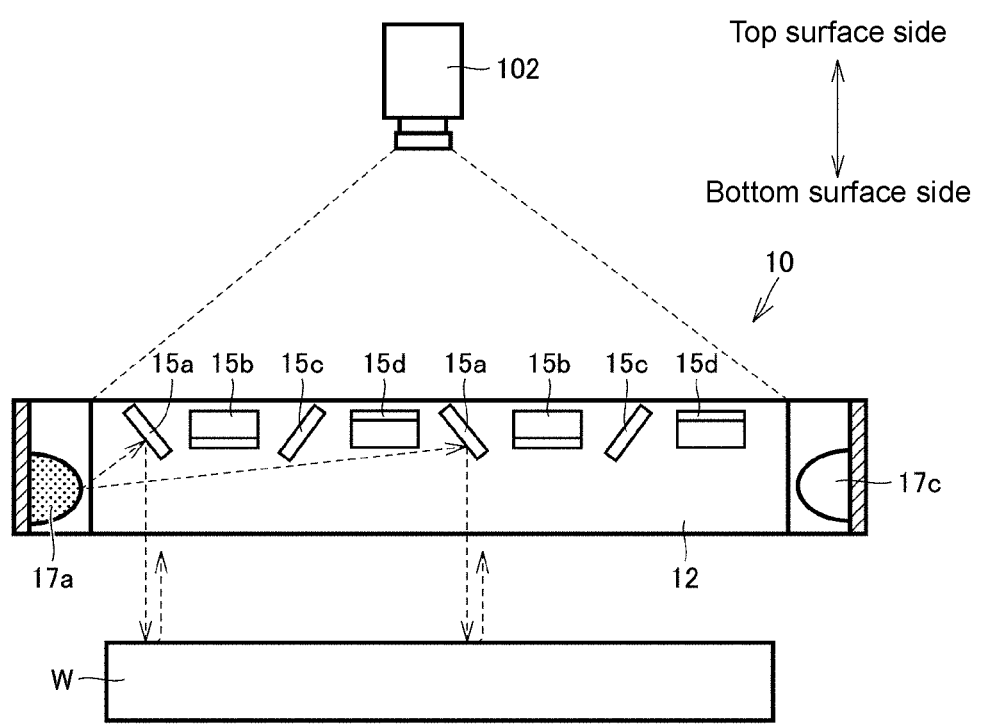
FIG. 5 is a schematic diagram showing a cross section of the illumination device when only the LED group A emits light in the illumination device according to the present embodiment.
Figure 6:
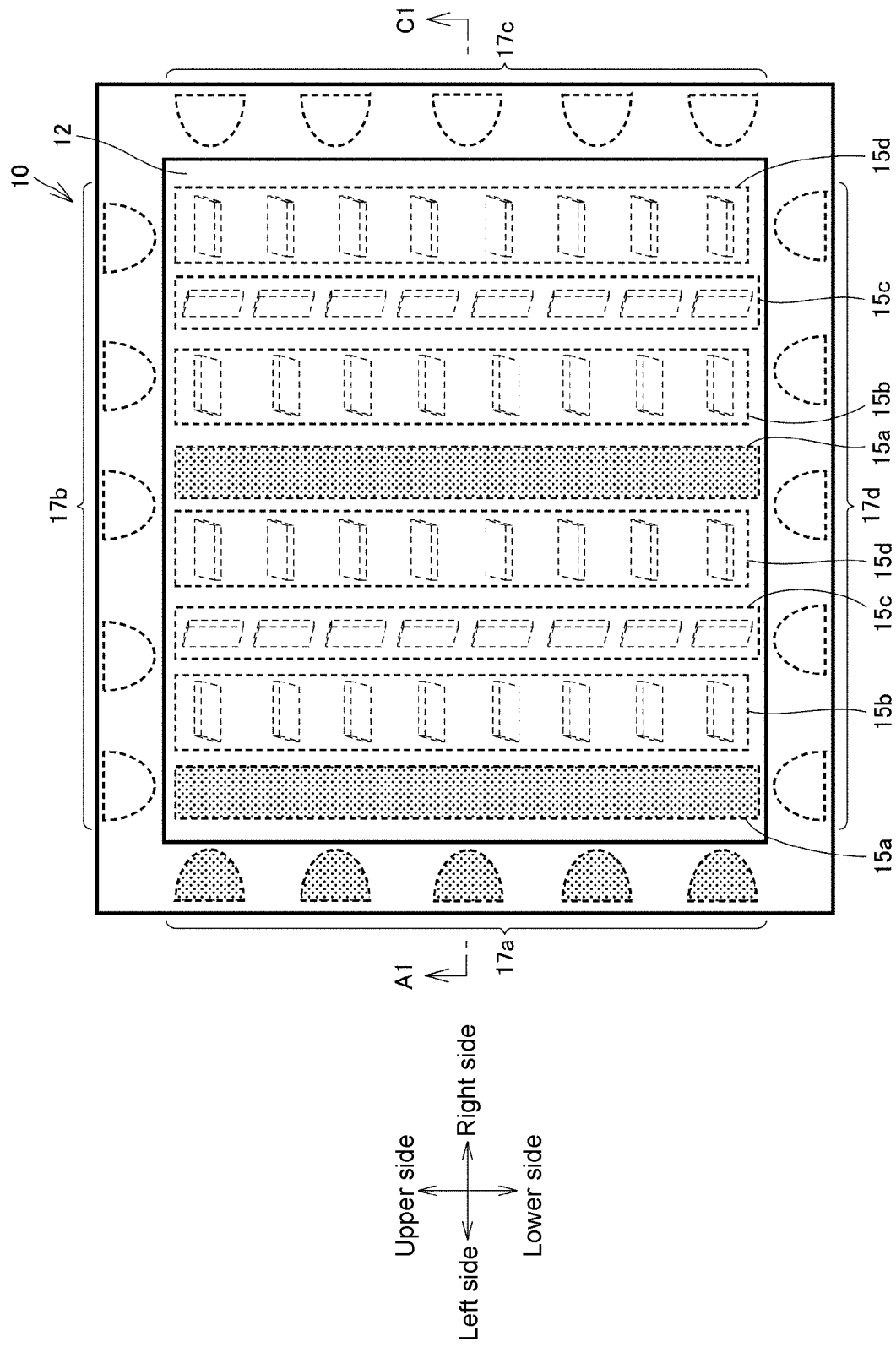
FIG. 6 is a schematic diagram showing the top surface of the illumination device when only the LED group A emits light in the illumination device according to the present embodiment.
Figure 7:
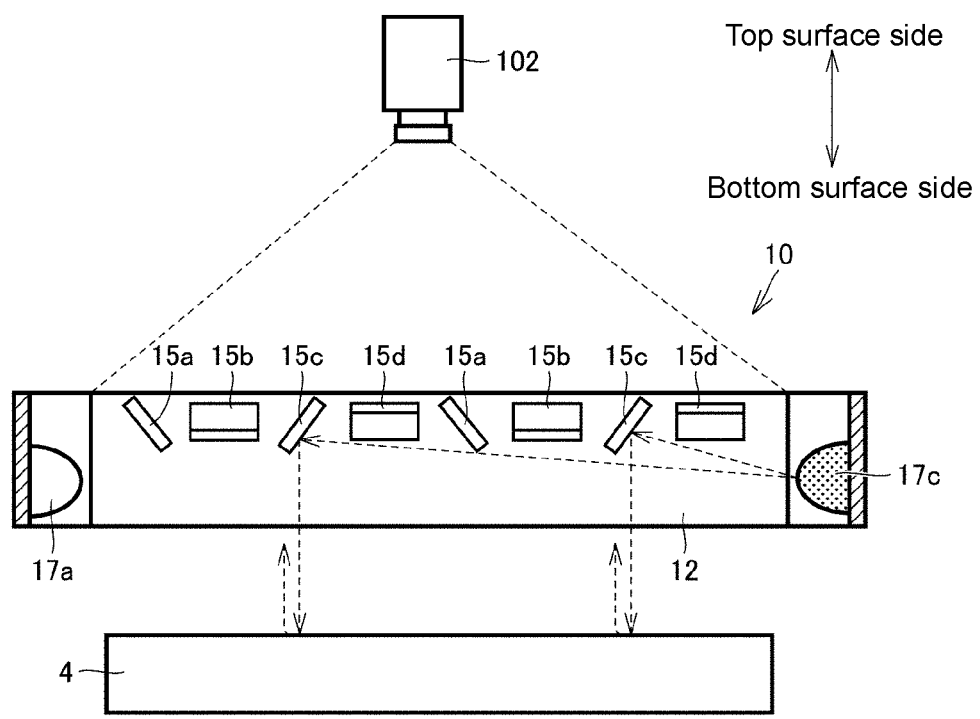
FIG. 7 is a schematic diagram showing a cross section of the illumination device when only the LED group C emits light in the illumination device according to the present embodiment.

An example of the gradation pattern formed by the illumination device 10 will be described with reference to FIG. 5 to FIG. 11(D). First, the gradation pattern formed on the light emitting surface of the light guide plate 12 by the illumination device 10 when only the LED group A emits light will be described with reference to FIG. 5 and FIG. 6. FIG. 5 is a schematic diagram showing a cross section of the illumination device 10 when only the LED group A emits light in the illumination device 10 according to the present embodiment. FIG. 6 is a schematic diagram showing the top surface of the illumination device 10 when only the LED group A emits light in the illumination device 10 according to the present embodiment. In FIG. 5, the cross section taken by cutting the illumination device 10 shown in FIG. 6 along A1-C1 is shown. In FIG. 5, for convenience of description, the side of the surface of the light guide plate 12 located on the side of the camera 102 is defined as "top surface side" and the side of the surface located on the side of the workpiece W is defined as "bottom surface side". In FIG. 7 which will be described later, the "top surface side" and the "bottom surface side" are defined in the same manner.

As shown in FIG. 5, when only the LED group A emits light, the light from the LED group A is introduced into the light guide plate 12 and is mainly reflected by the reflective plate 15a. The shape and position of the reflective plate 15a are designed so as to mainly reflect the light from the LED group A toward the workpiece W located directly below. On the other hand, the other reflective plates 15b to 15d are not designed to mainly reflect the light from the LED group A. For this reason, the light from the LED group A is mainly reflected by the reflective plate 15a and is emitted from the bottom surface side of the light guide plate 12 toward the workpiece W. The light emitted from the bottom surface side of the light guide plate 12 is irradiated substantially perpendicularly to the surface of the workpiece W and reflected toward the light guide plate 12 by the workpiece W. The light reflected by the workpiece W moves in the direction where the light guide plate 12 is located (the direction of the top surface side) and again passes through the inside of the light guide plate 12 to eventually reach the camera 102.

As shown in FIG. 6, when only the LED group A emits light, the light emitting surface of the light guide plate 12 forms a pattern of emission intensity distribution that makes the position corresponding to the reflective plate 15a the brightest and decreases the brightness as it is farther away from the position. In FIG. 6, only the position corresponding to the reflective plate 15a is brightened, but in fact the gradation pattern is formed by gradation that the brightness decreases as it is farther away from the position.

Figure 8:
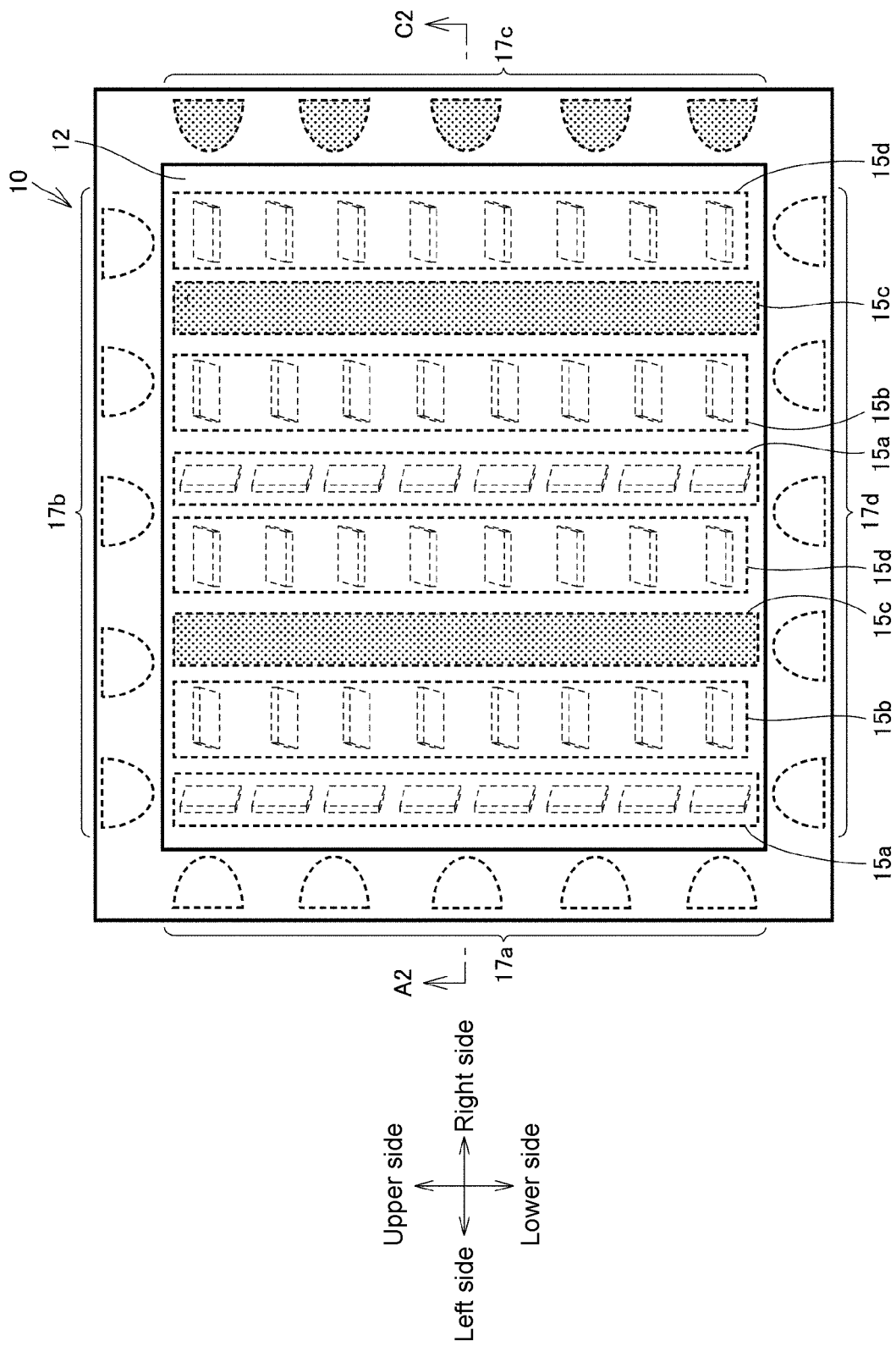
FIG. 8 is a schematic diagram showing the top surface of the illumination device when only the LED group C emits light in the illumination device according to the present embodiment.

Next, the gradation patternformed on the light emitting surface of the light guide plate 12 by the illumination device 10 when only the LED group C emits light will be described with reference to FIG. 7 and FIG. 8. FIG. 7 is a schematic diagram showing a cross section of the illumination device 10 when only the LED group C emits light in the illumination device 10 according to the present embodiment. FIG. 8 is a schematic diagram showing the top surface of the illumination device 10 when only the LED group C emits light in the illumination device 10 according to the present embodiment. In FIG. 7, the cross section taken by cutting the illumination device 10 shown in FIG. 8 along A2-C2 is shown.

As shown in FIG. 7, when only the LED group C emits light, the light from the LED group C is introduced into the light guide plate 12 and is mainly reflected by the reflective plate 15c. The shape and position of the reflective plate 15c are designed so as to mainly reflect the light from the LED group C toward the workpiece W located directly below. On the other hand, the other reflective plates 15a, 15b, and 15d are not designed to mainly reflect the light from the LED group C. For this reason, the light from the LED group C is mainly reflected by the reflective plate 15c and is emitted from the bottom surface side of the light guide plate 12 toward the workpiece W. The light emitted from the bottom surface side of the light guide plate 12 is irradiated substantially perpendicularly to the surface of the workpiece W and reflected toward the light guide plate 12 by the workpiece W. The light reflected by the workpiece W moves in the direction where the light guide plate 12 is located (the direction of the top surface side) and again passes through the inside of the light guide plate 12 to eventually reach the camera 102.

As shown in FIG. 8, when only the LED group C emits light, the light emitting surface of the light guide plate 12 forms a pattern of emission intensity distribution that makes the position corresponding to the reflective plate 15c the brightest and decreases the brightness as it is farther away from the position. In FIG. 8, only the position corresponding to the reflective plate 15c is brightened, but in fact the gradation pattern is formed by gradation that the brightness decreases as it is farther away from the position.

Figure 9:
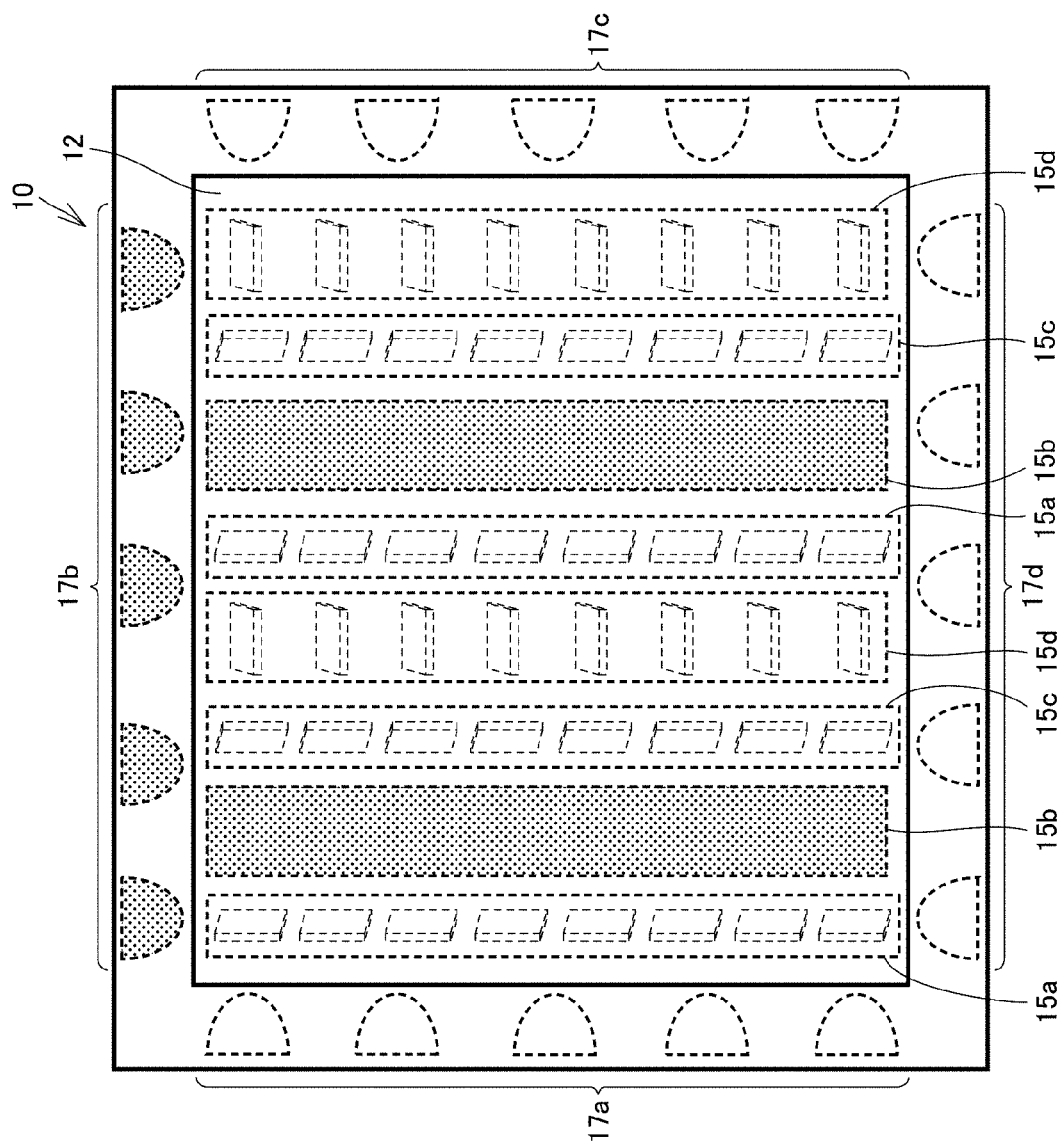
FIG. 9 is a schematic diagram showing the top surface of the illumination device when only the LED group B emits light in the illumination device according to the present embodiment.

Next, the gradation pattern formed on the light emitting surface of the light guide plate 12 by the illumination device 10 when only the LED group B emits light will be described with reference to FIG. 9. FIG. 9 is a schematic diagram showing the top surface of the illumination device 10 when only the LED group B emits light in the illumination device 10 according to the present embodiment.

Although the illustration is omitted, when only the LED group B emits light, as in the case where only the LED group A or only the LED group C emits light, the light from the LED group B is reflected by the workpiece W and eventually reaches the camera 102. Specifically, when only the LED group B emits light, the light from the LED group B is introduced into the light guide plate 12 and is mainly reflected by the reflective plate 15b. The shape and position of the reflective plate 15b are designed so as to mainly reflect the light from the LED group B toward the workpiece W located directly below. On the other hand, the other reflective plates 15a, 15c, and 15d are not designed to mainly reflect the light from the LED group B. For this reason, the light from the LED group B is mainly reflected by the reflective plate 15b and is emitted from the bottom surface side of the light guide plate 12 toward the workpiece W. The light emitted from the bottom surface side of the light guide plate 12 is irradiated substantially perpendicularly to the surface of the workpiece W and reflected toward the light guide plate 12 by the workpiece W. The light reflected by the workpiece W moves in the direction where the light guide plate 12 is located (the direction of the top surface side) and again passes through the inside of the light guide plate 12 to eventually reach the camera 102.

As shown in FIG. 9, when only the LED group B emits light, the light emitting surface of the light guide plate 12 forms a pattern of emission intensity distribution that makes the position corresponding to the reflective plate 15b the brightest and decreases the brightness as it is farther away from the position. In FIG. 9, only the position corresponding to the reflective plate 15b is brightened, but in fact the gradation pattern is formed by gradation that the brightness decreases as it is farther away from the position.

Figure 10:
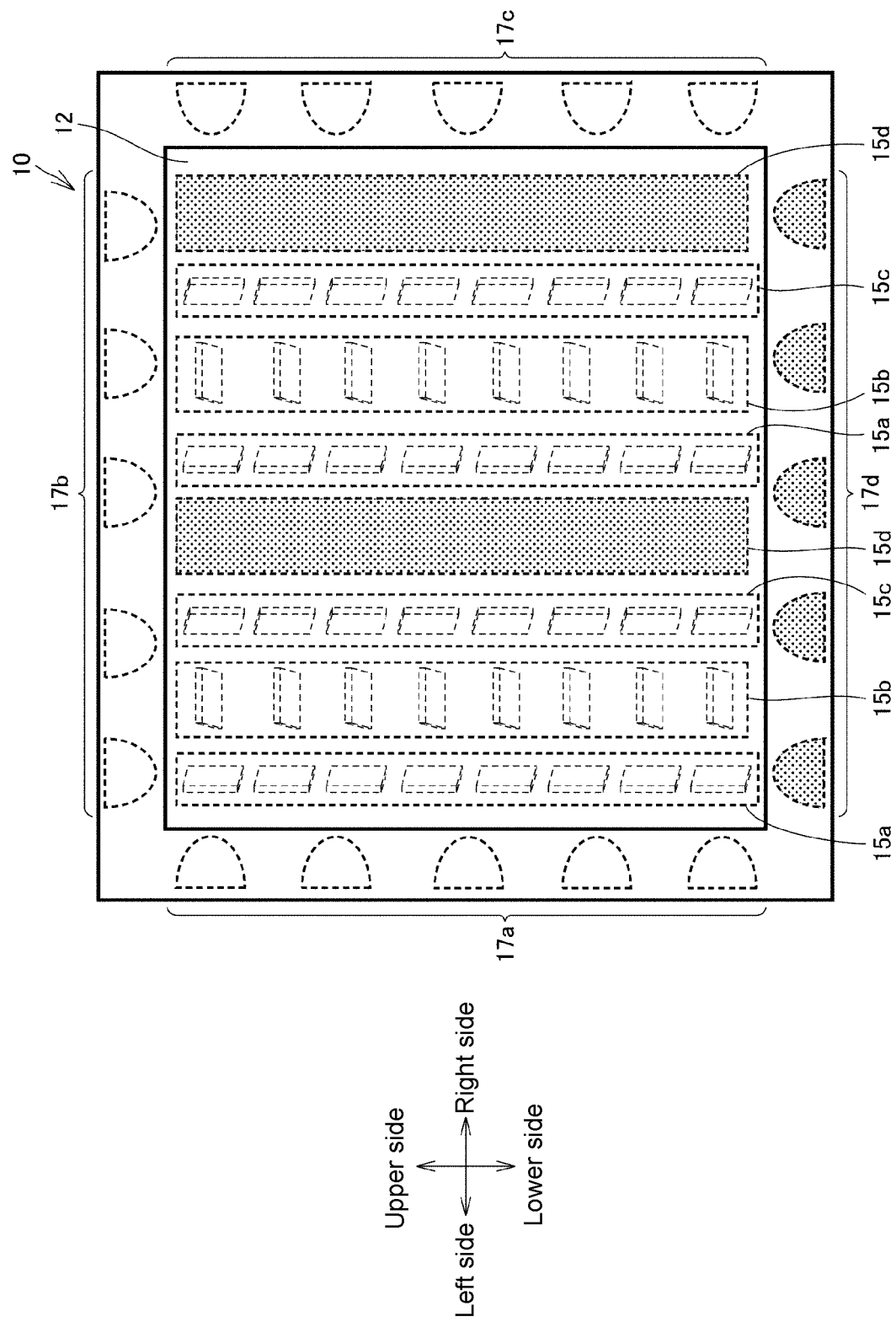
FIG. 10 is a schematic diagram showing the top surface of the illumination device when only the LED group D emits light in the illumination device according to the present embodiment.

Next, the gradation pattern formed on the light emitting surface of the light guide plate 12 by the illumination device 10 when only the LED group D emits light will be described with reference to FIG. 10. FIG. 10 is a schematic diagram showing the top surface of the illumination device 10 when only the LED group D emits light in the illumination device 10 according to the present embodiment.

Although the illustration is omitted, when only the LED group D emits light, as in the case where only the LED group A or only the LED group B, or only the LED group C emits light, the light from the LED group D is reflected by the workpiece W and eventually reaches the camera 102. Specifically, when only the LED group D emits light, the light from the LED group D is introduced into the light guide plate 12 and is mainly reflected by the reflective plate 15d. The shape and position of the reflective plate 15d are designed so as to mainly reflect the light from the LED group D toward the workpiece W located directly below. On the other hand, the other reflective plates 15a to 15c are not designed to mainly reflect the light from the LED group D. For this reason, the light from the LED group D is mainly reflected by the reflective plate 15d and is emitted from the bottom surface side of the light guide plate 12 toward the workpiece W. The light emitted from the bottom surface side of the light guide plate 12 is irradiated substantially perpendicularly to the surface of the workpiece W and reflected toward the light guide plate 12 by the workpiece W. The light reflected by the workpiece W moves in the direction where the light guide plate 12 is located (the direction of the top surface side) and again passes through the inside of the light guide plate 12 to eventually reach the camera 102.

As shown in FIG. 10, when only the LED group D emits light, the light emitting surface of the light guide plate 12 forms a pattern of emission intensity distribution that makes the position corresponding to the reflective plate 15d the brightest and decreases the brightness as it is farther away from the position. In FIG. 10, only the position corresponding to the reflective plate 15d is brightened, but in fact the gradation pattern is formed so that the brightness decreases as it is farther away from the position.

FIG. 11(A) to FIG. 11(D) are schematic diagrams for illustrating change of luminance of the light emitting surface of the light guide plate 12 when the LED group A to the LED group D respectively emit light in the light guide plate 12 according to the present embodiment. The luminance is an example of the "emission intensity".

Figure 11A:
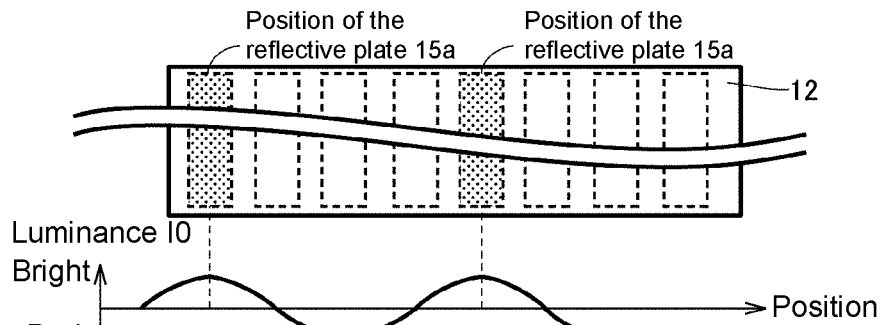
FIG. 11(A) to FIG. 11(D) are schematic diagrams for illustrating change of luminance of the light emitting surface of the light guide plate when the LED group A to the LED group D respectively emit light in the light guide plate according to the present embodiment.

As shown in FIG. 11(A), when only the LED group A emits light, the position corresponding to the reflective plate 15a becomes the brightest and has the highest luminance, and the brightness and luminance decrease as it is farther away from the position. If the change of the luminance I0 when only the LED group A emits light is graphed, ideally a sine wave graph is obtained.

Figure 11B:
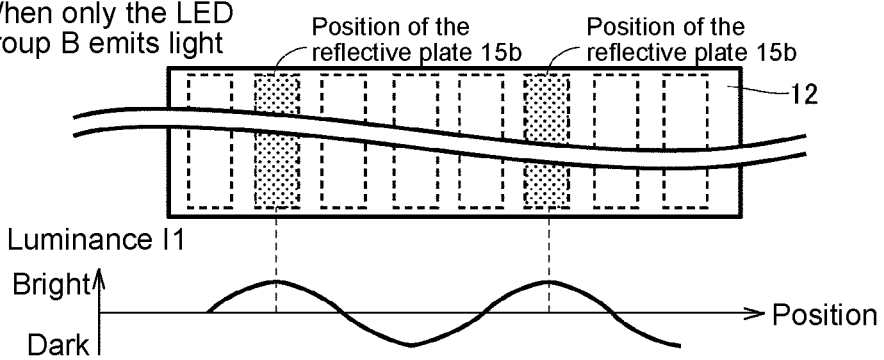

As shown in FIG. 11(B), when only the LED group B emits light, the position corresponding to the reflective plate 15b becomes the brightest and has the highest luminance, and the brightness and luminance decrease as it is farther away from the position. If the change of the luminance I1 when only the LED group B emits light is graphed, ideally a sine wave graph is obtained.

Figure 11C:
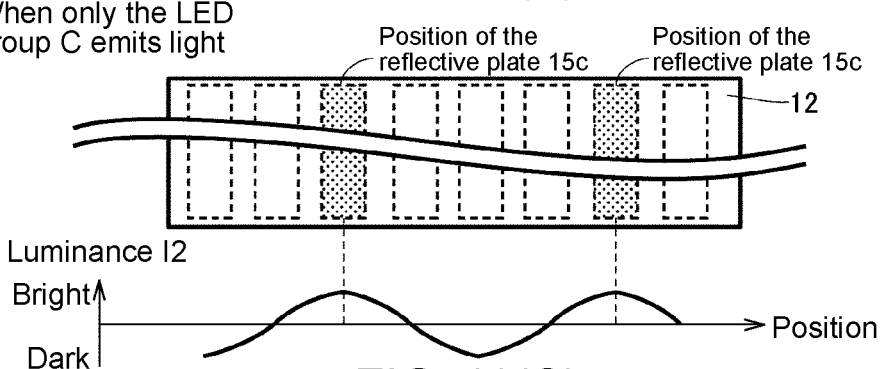

As shown in FIG. 11(C), when only the LED group C emits light, the position corresponding to the reflective plate 15c becomes the brightest and has the highest luminance, and the brightness and luminance decrease as it is farther away from the position. If the change of the luminance I2 when only the LED group C emits light is graphed, ideally a sine wave graph is obtained.

Figure 11D:
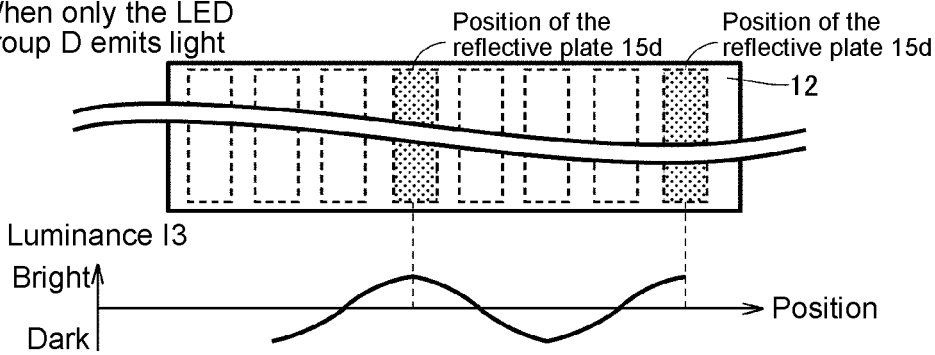

As shown in FIG. 11(D), when only the LED group D emits light, the position corresponding to the reflective plate 15d becomes the brightest and has the highest luminance, and the brightness and luminance decrease as it is farther away from the position. If the change of the luminance I3 when only the LED group D emits light is graphed, ideally a sine wave graph is obtained.

Since the reflective plates 15a to 15d are arranged respectively in rows in the light guide plate 12, as the light emitting target switches from the LED group A to the LED group D in the predetermined order, the phase of the graph of the sine wave representing the luminance I changes. Ideally, when the phases respectively in the case where only the LED group A emits light, the case where only the LED group B emits light, the case where only the LED group C emits light, and the case where only the LED group D emits light are compared, the phase changes by $\pi/2$ at a time with the switching between the LED groups.

As described above, the image inspection device 1 according to the present embodiment can switch the LED groups to serve as the light emitting target in the illumination device 10 to switch the gradation pattern on the light emitting surface of the light guide plate 12, and thereby change the phase of the graph of the sine wave representing the luminance corresponding to the position on the light emitting surface of the light guide plate 12.

<F. Image Inspection Process>

Figure 12:
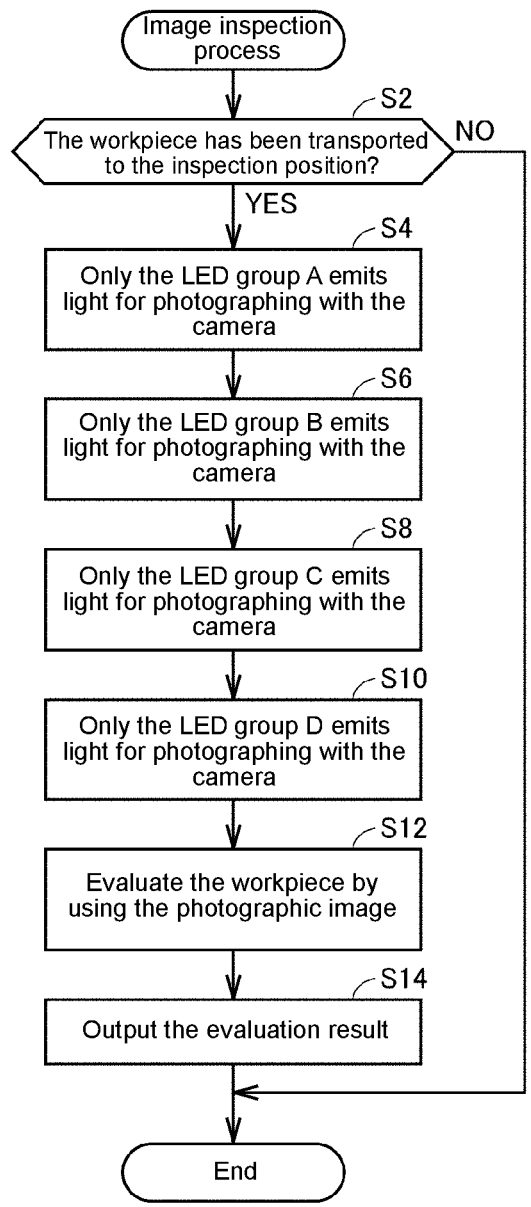
FIG. 12 is a flowchart showing a processing procedure of an image inspection process executed by the image inspection device according to the present embodiment.

An image inspection process executed by the image inspection device 1 according to the present embodiment will be described with reference to FIG. 12 and FIG. 13. FIG. 12 is a flowchart showing a processing procedure of the image inspection process executed by the image inspection device 1 according to the present embodiment. The image inspection process shown in FIG. 12 is executed by the control device 100 of the image inspection device 1. In the flowchart shown in FIG. 12, each step of the process is simply referred to as "S".

As shown in FIG. 12, the image inspection device 1 determines whether the workpiece W has been transported to the inspection position (S2). If the workpiece W has not been transported to the inspection position (NO in S2), the image inspection device 1 ends the image inspection process. On the other hand, if the workpiece W has been transported to the inspection position (YES in S2), the image inspection device 1 switches the LED group to serve as the light emitting target, and in conjunction with that, photographs the workpiece W through the light guide plate 12 with the camera 102.

Specifically, the image inspection device 1 first enables only the LED group A to emit light and photographs the workpiece W with the camera 102 (S4). Next, the image inspection device 1 enables only the LED group B to emit light and photographs the workpiece W with the camera 102 (S6). Next, the image inspection device 1 enables only the LED group C to emit light and photographs the workpiece W with the camera 102 (S8). Next, the image inspection device 1 enables only the LED group D to emit light and photographs the workpiece W with the camera 102 (S10). Then, the image inspection device 1 evaluates the workpiece W by using a plurality of photographic images in which different gradation patterns appear obtained in S4 to S10 (S12).

Figure 13:
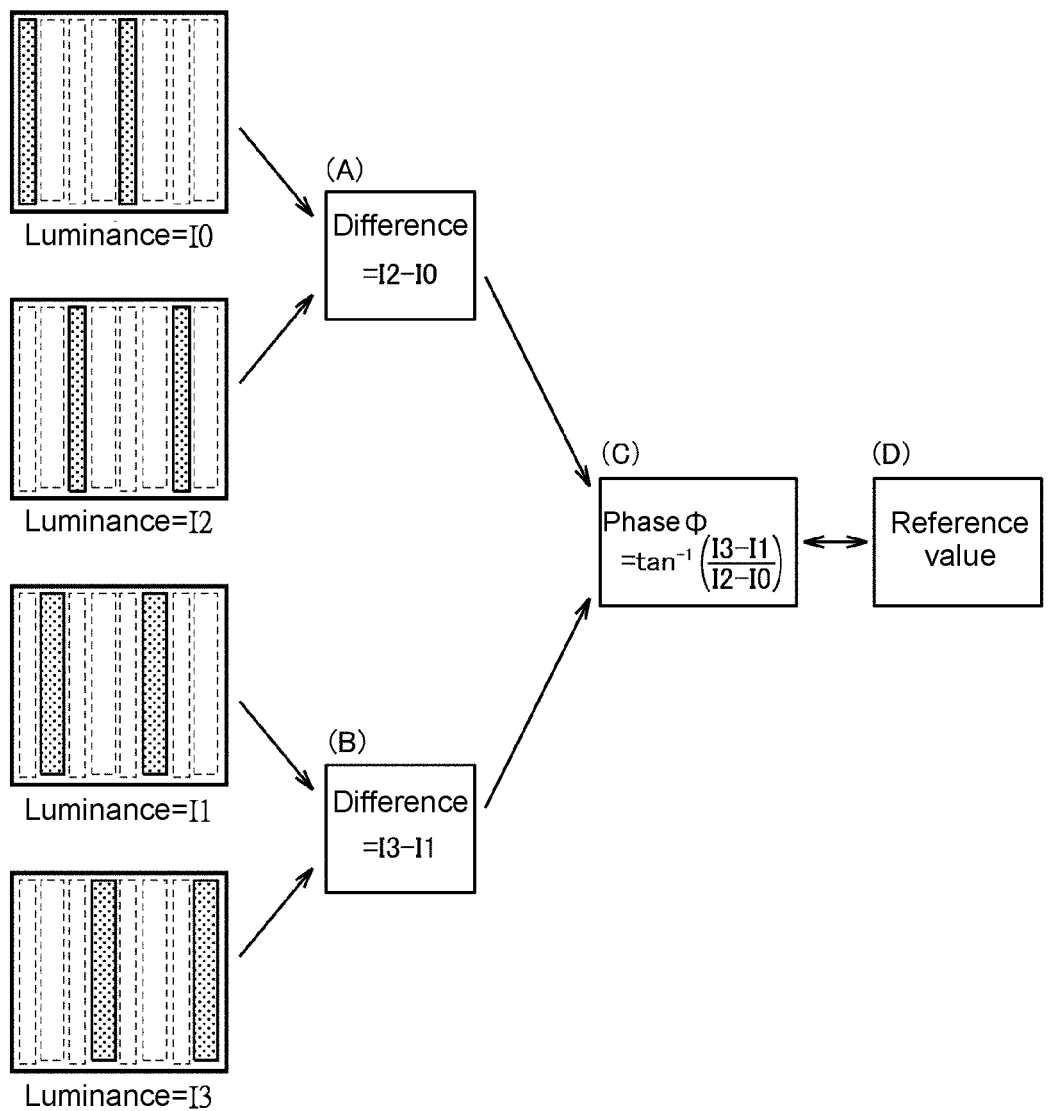
FIG. 13 is a schematic diagram for illustrating evaluation using a photographic image in the image inspection device according to the present embodiment.

Here, FIG. 13 is a schematic diagram for illustrating the evaluation using the photographic images in the image inspection device 1 according to the present embodiment. The image inspection device 1 according to the present embodiment inspects the appearance of the workpiece W by a phase shift method, which is a known technique, by using a plurality of photographic images in which different gradation patterns appear obtained in S4 to S10. For example, the phase shift method refers to a method for measuring three-dimensional information (height) of the surface of the workpiece W for each area based on the luminance I of a plurality of photographic images of the workpiece W, to which different gradation patterns are projected.

For example, for the area that is to be inspected, the image inspection device 1 obtains the difference (I2−I0) between the luminance I0 in the case where only the LED group A emits light and the luminance I2 in the case where only the LED group C emits light, as shown by (A) in FIG. 13, and obtains the difference (I3−I1) between the luminance I1 in the case where only the LED group B emits light and the luminance I3 in the case where only the LED group D emits light, as shown by (B) in FIG. 13. Then, the image inspection device 1 obtains the phase $\Phi$ of the normal line on the surface of the workpiece W based on the following equation, as shown by (C) in FIG. 13.

Phase $\Phi = \tan^{-1}\{(I3-I1)/(I2-I0)\}$

As shown by (D) in FIG. 13, the image inspection device 1 inspects the surface of the workpiece W by comparing the obtained phase $\Phi$ with a reference value acquired in advance. For example, if the difference between the obtained phase $\Phi$ and the reference value exceeds a threshold value, the image inspection device 1 determines that the appearance of the workpiece W is defective, such as scratch.

Returning to FIG. 12, when evaluating the workpiece W by using the photographic images (S12), the image inspection device 1 outputs an evaluation result (S14). As a result, based on the evaluation result, the workpiece W with a defective appearance is discharged by an external device (not shown), and the workpiece W having no defect in appearance is transported out to the next process. Thereafter, the image inspection device 1 ends the image inspection process.

<G Function and Effect>

As described above, in the image inspection device 1 of the present embodiment, the light guide plate 12 of the illumination device 10 is disposed at any position between the workpiece W and the camera 102, and the emission intensity distributions of the gradation patterns on the light emitting surface of the light guide plate 12 can be differentiated by controlling any of the LED group A to the LED group D. Therefore, it is possible to make the entire device smaller than a device in which the illumination device 10 is not located between the workpiece W and the camera 102 and change the emission intensity distribution of the gradation pattern on the light emitting surface of the light guide plate 12. As a result, the provided image inspection device 1 can avoid restriction in selecting applicable equipment as much as possible. In addition, while the workpiece W, the camera 102, and the light from the illumination device 10 are constantly put on the same axis, the phase of the gradation pattern foimed on the light emitting surface of the light guide plate 12 can be changed by switching the LEDs that serve as the light emitting target. Therefore, it is possible to inspect the appearance of the workpiece W accurately without using a transport mechanism, etc. Furthermore, by constantly putting the workpiece W, the camera 102, and the light from the illumination device 10 on the same axis, the three distances can be kept short. Therefore, light leakage can be prevented as much as possible, and the appearance of the workpiece W can be inspected more accurately.

One light guide plate 12 is provided, the LED group A to the LED group D are disposed around one light guide plate 12, and the reflective plates 15a to 15d are included in one light guide plate 12. Therefore, it is possible to configure the illumination device 10 with one light guide plate 12 and to make the entire device smaller.

The control device 100 selectively switches and controls the LED group A to the LED group D in the predetermined order and photographs the workpiece W with the camera 102 every time the control for the LED group A to the LED group D is switched. Therefore, it is possible to perform the selective switching between the LED group A to the LED group D in conjunction with the photographing of the camera 102.

The processor 110 of the control device 100 can increase or decrease the number of the LEDs that serve as the light emitting target, selectively switch the LEDs that serve as the light emitting target, or adjust the power supply so as to change the emission amount of the LEDs included in the LED group A to the LED group D to adjust the brightness. Therefore, it is possible to inspect the workpiece W under optimum conditions to prevent problems such as halation as much as possible.

<H. Modified Example>

(About the Reflective Part)

In the present embodiment, the reflective plates 15a to 15d which are flat plate-shaped members inside the light guide plate 12 are provided as an example of the first reflective part and the second reflective part. However, the first reflective part and the second reflective part are not necessarily such members inside the light guide plate 12. For example, FIG. 14 is a schematic diagram showing a cross section of the illumination device 20 according to a modified example.

Figure 14:
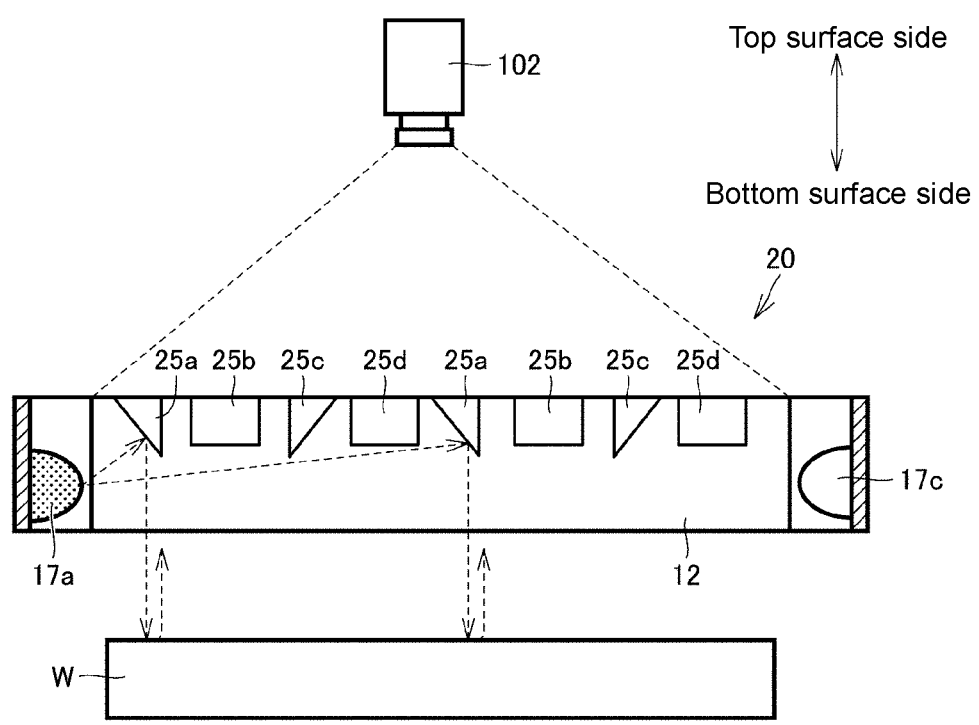
FIG. 14 is a schematic diagram showing a cross section of the illumination device according to a modified example.

As shown in FIG. 14, in an illumination device 20 according to the modified example, a plurality of reflective parts 25a to 25d may be formed by cutting out a part of the light guide plate 12. Specifically, a plurality of reflective parts 25a to 25d having different refractive indices may be formed for each area by processing the surface of the light guide plate 12 by laser processing, etc. The reflective part 25a is formed by cutting out a part of the light guide plate 12 to form an inclination angle for mainly reflecting the light from the LED group A. The reflective part 25b is formed by cutting out a part of the light guide plate 12 to form an inclination angle for mainly reflecting the light from the LED group B (not shown). The reflective part 25c is formed by cutting out a part of the light guide plate 12 to form an inclination angle for mainly reflecting the light from the LED group C. The reflective part 25d is formed by cutting out a part of the light guide plate 12 to foram an inclination angle for mainly reflecting the light from the LED group D (not shown).

As described above, in the illumination device 20 according to the modified example, the reflective parts 25a to 25d are formed by cutting out a part of the light guide plate 12. Therefore, it is not required to prepare separate members for the reflective parts.

(About the Light Guide Plate)

The present embodiment illustrates an example that the LED group A to the LED group D are disposed around one light guide plate 12 and the reflective plates 15a to 15d are provided inside one light guide plate 12. However, the number of the light guide plates 12 is not necessarily one. For example, FIG. 15 is a schematic diagram showing a cross section of an illumination device 30 according to a modified example.

Figure 15:
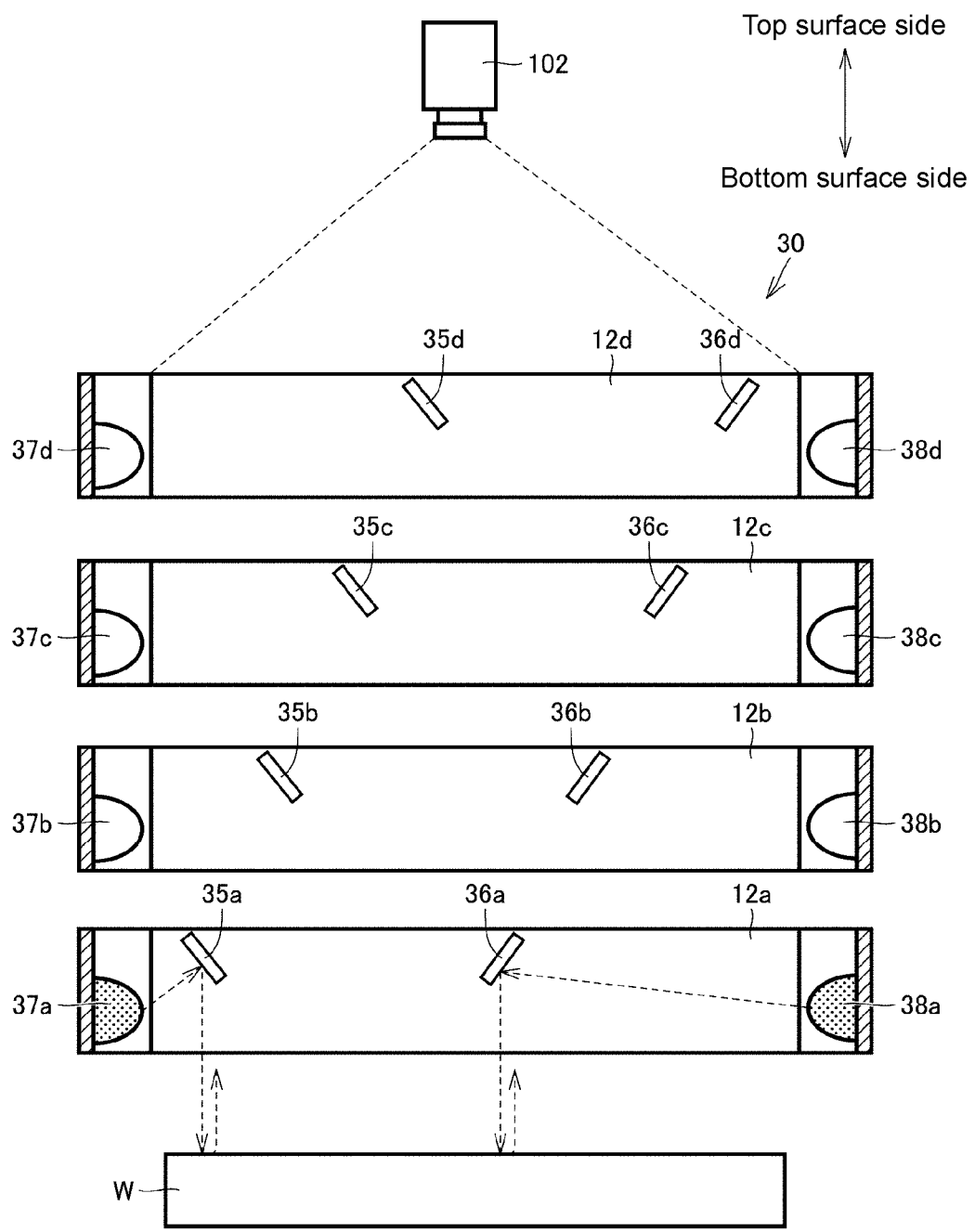
FIG. 15 is a schematic diagram showing a cross section of the illumination device according to a modified example.

As shown in FIG. 15, in the illumination device 30 according to the modified example, a plurality of light guide plates may be included. The LED groups may be disposed around each light guide plate, and further the reflective part may be included in the light guide plate to correspond to each LED group. Specifically, the illumination device 30 includes a plurality of light guide plates 12a to 12d located between the workpiece W and the camera 102. Around the light guide plate 12a, a plurality of LEDs 37a and 38a are disposed, and a plurality of reflective plates 35a and 36a which are inclined to form an inclination angle for mainly reflecting the light from the LEDs 37a and 38a are provided inside the light guide plate 12a. Around the light guide plate 12b, a plurality of LEDs 37b and 38b are disposed, and a plurality of reflective plates 35b and 36b which are inclined to form an inclination angle for mainly reflecting the light from the LEDs 37b and 38b are provided inside the light guide plate 12b. Around the light guide plate 12c, a plurality of LEDs 37c and 38c are disposed, and a plurality of reflective plates 35c and 36c which are inclined to form an inclination angle for mainly reflecting the light from the LEDs 37c and 38c are provided inside the light guide plate 12c. Around the light guide plate 12d, a plurality of LEDs 37d and 38d are disposed, and a plurality of reflective plates 35d and 36d which are inclined to form an inclination angle for mainly reflecting the light from the LEDs 37d and 38d are provided inside the light guide plate 12d.

Since the reflective plates included in each of the light guide plates 12a to 12b are arranged with their positions shifted in the lateral direction of the light guide plate, the irradiation position with respect to the workpiece W when the light from the LED is reflected is shifted. For example, in the case where the positions of the reflective plates 35a and 36a are set corresponding to the position of the reflective plate 15a in the present embodiment, when the LEDs 37a and 38a emit light in the light guide plate 12a, the gradation pattern as shown in FIG. 11(A) is formed. In the case where the positions of the reflective plates 35b and 36b are set corresponding to the position of the reflective plate 15b in the present embodiment, when the LEDs 37b and 38b emit light in the light guide plate 12b, the gradation pattern as shown in FIG. 11(B) is formed. In the case where the positions of the reflective plates 35c and 36c are set corresponding to the position of the reflective plate 15c in the present embodiment, when the LEDs 37c and 38c emit light in the light guide plate 12c, the gradation pattern as shown in FIG. 11(C) is foil led. In the case where the positions of the reflective plates 35d and 36d are set corresponding to the position of the reflective plate 15d in the present embodiment, when the LEDs 37d and 38d emit light in the light guide plate 12d, the gradation pattern as shown in FIG. 11(D) is formed.

In the illumination device 30 according to the modified example, one of the light guide plates 12a to 12d is an example of the "first light guide plate", and another is an example of the "second light guide plate". Furthermore, one of the LEDs 37a and 38a to 37d and 38d is an example of the "first light emitting part", and another is an example of the "second light emitting part". In addition, one of the reflective plates 35a and 36a to 35d and 36d is an example of the "first reflective part", and another is an example of the "second reflective part".

As described above, regarding the illumination device 30 according to the modified example, the illumination device can be configured by using a plurality of light guide plates 12a to 12d. Therefore, the illumination device can be designed for each of the light guide plates 12a to 12d.
(About the Light Emitting Part)

The present embodiment illustrates an example that the LED group A to the LED group D emit white light. However, the light color of the LED group A to the LED group D is not necessarily white and may be red, green, blue, etc., or a combination of these colors. For example, FIG. 16 is a schematic diagram showing the top surface of an illumination device 40 according to a modified example.

Figure 16:
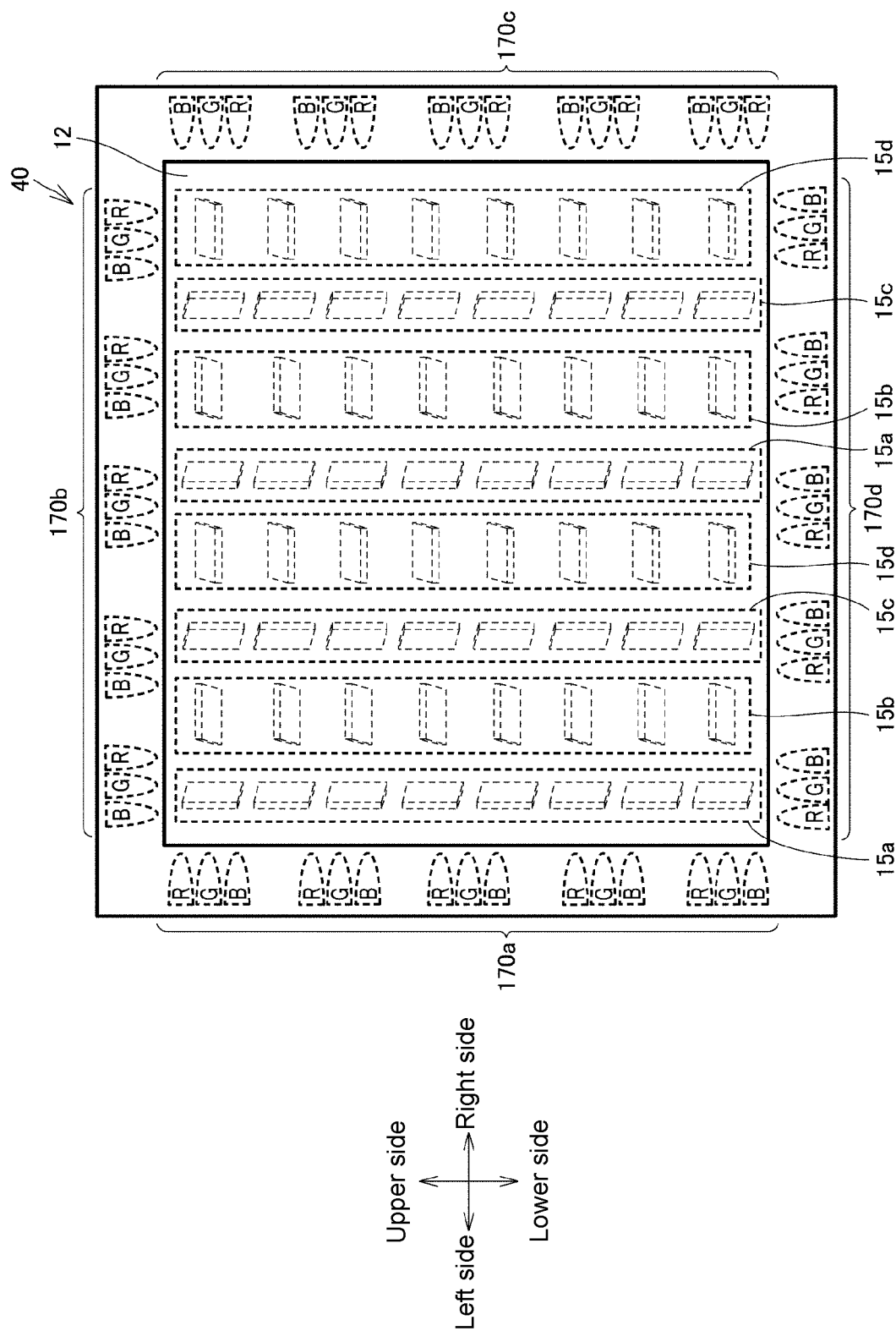
FIG. 16 is a schematic diagram showing the top surface of the illumination device according to a modified example.

As shown in FIG. 16, in the illumination device 40 according to the modified example, a plurality of LEDs 170a to 170d are disposed around the light guide plate 12. The respective LEDs include a red LED indicated by "R", a green LED indicated by "G", and a blue LED indicated by "B". The control device 100 can selectively determine any of the red LED, the green LED, and the blue LED in each of the LEDs 170a to 170d, or an appropriate combination as the light emitting target. In other words, in the illumination device 40 according to the modified example, the wavelength of the light from each of the LEDs 170a to 170d may be changeable.

As described above, regarding the illumination device 40 according to the modified example, the wavelength of the light from the illumination device 40 can be changed. Therefore, the workpiece W can be inspected under optimum conditions to prevent problems such as halation as much as possible.
(About the Evaluation)

In the present embodiment, the phase Φ of the normal line on the surface of the workpiece W is calculated by the phase shift method and the calculated phase Φ is compared with the reference value acquired in advance so as to inspect the surface of the workpiece W. However, the target to be used for comparison with the calculated phase Φ is not necessarily the reference value acquired in advance. For example, when the phase of the area to be inspected is different from the surrounding phase, or when the phase is changing rapidly, it may be determined that the appearance of the workpiece W is defective. In addition, instead of using the phase shift method, the final inspection result may also be obtained by respectively evaluating the photographic images that are obtained and integrating the evaluation results.

In the present embodiment, a plurality of photographic images are acquired by photographing with the camera 102 every time each of the LED group A to the LED group D is enabled to emit light solely, but the disclosure is not limited thereto. For example, a plurality of photographic images may be acquired by photographing with the camera 102 with the LED group A and the LED group B emitting light, photographing with the camera 102 with the LED group C and the LED group D emitting light, photographing with the camera 102 with the LED group B and the LED group C emitting light, and photographing with the camera 102 with the LED group A and the LED group D emitting light.
<I. Appendix>

As described above, the present embodiment and the modified examples include the following disclosure.

(Configuration 1) An image inspection device (1) for inspecting an object (W) by using a photographic image, the image inspection device comprising:

a photographing part (102) photographing the object;

an illumination part (10) comprising a light guide plate (12) disposed at any position between the object and the photographing part; and a control part (100) controlling the illumination part and the photographing part, wherein the illumination part comprises:

a first light emitting part (17a) and a second light emitting part (17c) disposed around the light guide plate; and a plurality of reflective parts (15a to 15d) comprising a first reflective part (15a) reflecting mainly light from the first light emitting part toward the object and a second reflective part (15b) reflecting mainly light from the second light emitting part toward the object, and the reflective parts are configured so that a light emitting surface of the light guide plate has an emission intensity distribution of a first pattern when the first light emitting part emits light under control of the control part, and the light emitting surface has an emission intensity distribution of a second pattern different from the first pattern when the second light emitting part emits light under control of the control part.

(Configuration 2) The image inspection device according to configuration 1, wherein each of the first pattern and the second pattern is a gradation pattern, and the gradation patterns of the first pattern and the second pattern are shifted from each other.

(Configuration 3) The image inspection device according to configuration 1 or 2, wherein one light guide plate is provided, the first light emitting part and the second light emitting part are disposed around the one light guide plate, and the first reflective part and the second reflective part are included in the one light guide plate.

(Configuration 4) The image inspection device according to configuration 1 or 2, wherein the light guide plate is composed of a plurality of plates comprising a first light guide plate (12a) and a second light guide plate (12c), the first light emitting part (37a, 38a) is disposed around the first light guide plate, the second light emitting part (37c, 38c) is disposed around the second light guide plate, the first reflective part (35a, 36a) is included in the first light guide plate, and the second reflective part (35c, 36c) is included in the second light guide plate.

(Configuration 5) The image inspection device according to any one of configurations 1 to 4, wherein the reflective parts (25a to 25d) are formed by cutting out a part of the light guide plate.

(Configuration 6) The image inspection device according to any one of configurations 1 to 5, wherein the control part selectively switches and controls the first light emitting part and the second light emitting part in a predetermined order, and photographs the object with the photographing part every time control for the first light emitting part and the second light emitting part is switched.

(Configuration 7) The image inspection device according to any one of configurations 1 to 6, wherein at least one of the first light emitting part and the second light emitting part is configured to be capable of changing an emission wavelength.

(Configuration 8) The image inspection device according to any one of configurations 1 to 7, wherein the control part changes an emission amount of at least one of the first light emitting part and the second light emitting part.

(Configuration 9) An illumination device (10, 20, 30, 40) comprising the illumination part according to any one of configurations 1 to 8.

It should be considered that each embodiment as disclosed above is exemplary in all respects and is not restrictive. The scope of the disclosure is indicated by the claims rather than the description above, and the disclosure is intended to include any modification within the meaning and scope equivalent to the claims. Also, the disclosure described in the embodiment and each modified example is intended to be implemented as much as possible, either solely or in combination.

What is claimed is:

1. An image inspection device for inspecting an object by using a photographic image, the image inspection device comprising:
    a photographing part photographing the object;
    an illumination part comprising a light guide plate disposed at any position between the object and the photographing part; and
    a control part configured to control the illumination part and the photographing part, to switch between a first pattern of emission intensity distribution and a second pattern of emission intensity distribution for emitting to the object,
    wherein the illumination part comprises:
        a first light emitting part and a second light emitting part disposed around the light guide plate; and
        a plurality of reflective parts included inside the light guide plate and comprising a first reflective part reflecting mainly light from the first light emitting part toward the object and a second reflective part reflecting mainly light from the second light emitting part toward the object, and
    the reflective parts are configured so that a light emitting surface of the light guide plate has the first pattern of emission intensity distribution when the first light emitting part emits light under control of the control part, and the light emitting surface has the second pattern of emission intensity distribution different from the first pattern of emission intensity distribution when the second light emitting part emits light under control of the control part.

2. The image inspection device according to claim 1, wherein each of the first pattern of emission intensity distribution and the second pattern of emission intensity distribution is a gradation pattern, and
    the gradation patterns of the first pattern of emission intensity distribution and the second pattern of emission intensity distribution are shifted from each other.

3. The image inspection device according to claim 2, wherein one light guide plate is provided, and
    the first light emitting part and the second light emitting part are disposed around the one light guide plate.

4. The image inspection device according to claim 1, wherein one light guide plate is provided, and
    the first light emitting part and the second light emitting part are disposed around the one light guide plate.

5. The image inspection device according to claim 2, wherein the light guide plate is composed of a plurality of plates comprising a first light guide plate and a second light guide plate,
    the first light emitting part is disposed around the first light guide plate,
    the second light emitting part is disposed around the second light guide plate,
    the first reflective part is included in the first light guide plate, and
    the second reflective part is included in the second light guide plate.

6. The image inspection device according to claim 1, wherein the light guide plate is composed of a plurality of plates comprising a first light guide plate and a second light guide plate,
    the first light emitting part is disposed around the first light guide plate,
    the second light emitting part is disposed around the second light guide plate,
    the first reflective part is included in the first light guide plate, and
    the second reflective part is included in the second light guide plate.

7. The image inspection device according to claim 2, wherein the reflective parts are formed by cutting out a part of the light guide plate.

8. The image inspection device according to claim 1, wherein the reflective parts are formed by cutting out a part of the light guide plate.

9. The image inspection device according to claim 2, wherein the control part selectively switches and controls the first light emitting part and the second light emitting part in a predetermined order, and photographs the object with the photographing part every time control for the first light emitting part and the second light emitting part is switched.

10. The image inspection device according to claim 1, wherein the control part selectively switches and controls the first light emitting part and the second light emitting part in a predetermined order, and photographs the object with the photographing part every time control for the first light emitting part and the second light emitting part is switched.

11. The image inspection device according to claim 2, wherein at least one of the first light emitting part and the second light emitting part is configured to be capable of changing an emission wavelength.

12. The image inspection device according to claim 1, wherein at least one of the first light emitting part and the second light emitting part is configured to be capable of changing an emission wavelength.

13. The image inspection device according to claim 2, wherein the control part changes an emission amount of at least one of the first light emitting part and the second light emitting part.

14. The image inspection device according to claim 1, wherein the control part changes an emission amount of at least one of the first light emitting part and the second light emitting part.

15. An illumination device comprising the illumination part according to claim 1.

* * * * *